(12) United States Patent
Ullom et al.

(10) Patent No.: US 10,914,694 B2
(45) Date of Patent: Feb. 9, 2021

(54) X-RAY SPECTROMETER

(71) Applicant: Government of the United States of America, as represented by the Secretary of Commerce, Gaithersburg, MD (US)

(72) Inventors: Joel Ullom, Boulder, CO (US); Galen O'Neil, Boulder, CO (US); Luis Miaja Avila, Louisville, CO (US); Kevin Silverman, Boulder, CO (US); Daniel Swetz, Boulder, CO (US); Ralph Jimenez, Boulder, CO (US); William Bertrand Doriese, Boulder, CO (US); Gene Hilton, Boulder, CO (US); Carl Reintsema, Boulder, CO (US); Daniel Schmidt, Boulder, CO (US); Bradley K. Alpert, Boulder, CO (US); Jens Uhlig, Dalby (SE); Young Joe, Boulder, CO (US); Wilfred K. Fullagar, Weetangera (AU); Villy Sundstrom, Simrishamn (SE); Ilari Maasilta, Jyvaskyla (FI); Joseph Fowler, Boulder, CO (US)

(73) Assignee: GOVERNMENT OF THE UNITED STATES OF AMERICA, AS REPRESENTED BY THE SECRETARY OF COMMERCE, Gaithersburg, MD (US)

(*) Notice: Subject to any disclaimer, the term of this patent is extended or adjusted under 35 U.S.C. 154(b) by 375 days.

(21) Appl. No.: 15/865,992

(22) Filed: Jan. 9, 2018

(65) Prior Publication Data

US 2019/0064084 A1 Feb. 28, 2019

Related U.S. Application Data

(60) Provisional application No. 62/549,184, filed on Aug. 23, 2017.

(51) Int. Cl.
*G01T 1/36* (2006.01)
*G01N 23/223* (2006.01)
(Continued)

(52) U.S. Cl.
CPC ....... *G01N 23/223* (2013.01); *G01N 23/2076* (2013.01); *G01T 1/36* (2013.01);
(Continued)

(58) Field of Classification Search
CPC ............ G01N 23/223; G01N 23/2076; G01N 23/2206; G01T 1/36
See application file for complete search history.

(56) References Cited

U.S. PATENT DOCUMENTS 5,777,336 A * 7/1998 Silver .................. G01N 23/207
250/336.2
5,880,467 A * 3/1999 Martinis .................. G21K 1/06
250/310
(Continued)

OTHER PUBLICATIONS

English translation of JP application JP 2009 270465 (Published as JP 2011112561 A).*
(Continued)

*Primary Examiner* — David P Porta
*Assistant Examiner* — Djura Malevic
(74) *Attorney, Agent, or Firm* — Office of Chief Counsel for National Institute of Standards and Technology

(57) ABSTRACT

An x-ray spectrometer includes: an x-ray plasma source that produces first x-rays; an x-ray optic in optical communication with the x-ray plasma source and that: receives the first x-rays from the x-ray plasma source; focuses the first x-rays to produce second x-rays; and communicates the second x-rays to a sample that produces product x-rays in response to receipt of the second x-rays and second light; and a microcalorimeter array detector in optical communication (Continued)

US 10,914,694 B2

Page 2 with the sample and that receives the product x-rays from the sample.

14 Claims, 14 Drawing Sheets

(51) Int. Cl.
*H05G 2/00* (2006.01)
*G01N 23/207* (2018.01)
*G01N 23/2206* (2018.01)

(52) U.S. Cl.
CPC ......... *H05G 2/008* (2013.01); *G01N 23/2206* (2013.01); *G01N 2223/076* (2013.01); *H05G 2/003* (2013.01)

(56) References Cited

U.S. PATENT DOCUMENTS

| | | | | |
|---|---|---|---|---|
| 5,880,468 | A * | 3/1999 | Irwin | G01B 11/0616 250/336.2 |
| 6,094,471 | A * | 7/2000 | Silver | G03F 7/70166 378/145 |
| 6,479,818 | B1 * | 11/2002 | McCarthy | G01N 23/083 250/307 |
| 6,697,454 | B1 * | 2/2004 | Nicolich | G21K 1/06 378/48 |
| 8,357,894 | B2 * | 1/2013 | Toth | H01J 37/256 250/306 |
| 8,831,175 | B2 * | 9/2014 | Silver | G21K 1/067 378/84 |
| 9,823,203 | B2 * | 11/2017 | Yun | H01J 35/08 |
| 10,295,486 | B2 * | 5/2019 | Yun | G01N 23/20058 |
| 10,416,099 | B2 * | 9/2019 | Yun | G21K 1/06 |
| 2004/0158440 | A1 * | 8/2004 | Warburton | G01T 1/17 702/190 |
| 2006/0255290 | A1 * | 11/2006 | Bhadare | H01J 37/02 250/443.1 |
| 2009/0190720 | A1 * | 7/2009 | Windt | A61B 6/4021 378/146 |
| 2011/0064191 | A1 * | 3/2011 | Toth | H01J 37/256 378/53 |
| 2013/0188778 | A1 * | 7/2013 | Silver | G21K 1/067 378/145 |
| 2017/0336334 | A1 * | 11/2017 | Yun | H01J 35/08 |
| 2019/0011379 | A1 * | 1/2019 | Yun | H01J 35/10 |
| 2019/0064084 | A1 * | 2/2019 | Ullom | G01T 1/36 |

OTHER PUBLICATIONS

Miaja-Avila et al.,Laser plasma x-ray source for ultrafast timeresolved x-ray absorption spectroscopy, Struct. Dyn. 2, 024301 (2015).*
Byu, Michael Johnson and Dr. Scott Bergeson, Physics and Astronomy, Calibration of an x-ray Spectrometer, Sep. 27, 2013.*
Fullagar, W., et al., A broadband laser plasma x-ray source for application in ultrafast chemical structure dynamics, Review of Scientific Instruments, 2007, 115105, 78.
Fullagar, W., et al., The use and characterization of a backilluminated charge-coupled device in investigations of pulsed x-ray and ratiation sources, Review of Scientific Instruments, 2008, 103302, 79.
Fullagar, W., et al., Lab-based ultrafast molecular structure, The 10th International Conference on Synchrotron Radiation and Instrumentation, 2010, 919-922.

* cited by examiner

X-RAY SPECTROMETER

CROSS REFERENCE TO RELATED APPLICATIONS

This application claims the benefit of U.S. Provisional Patent Application Ser. No. 62/549,184, filed Aug. 23, 2017, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce, and under Agreement No. 16480-A4001 awarded by the Office of Basic Energy Sciences of the Department of Energy. The Government has certain rights in the invention. Licensing inquiries may be directed to the Technology Partnerships Office, NIST, Gaithersburg, Md., 20899; voice (301) 301-975-2573; email tpo@nist.gov; reference NIST Ser. No. 15/865,992.

BRIEF DESCRIPTION

Disclosed is an x-ray spectrometer comprising: an x-ray plasma source that produces first x-rays; an x-ray optic in optical communication with the x-ray plasma source and that: receives the first x-rays from the x-ray plasma source; focuses the first x-rays to produce second x-rays; and communicates the second x-rays to a sample that produces product x-rays in response to receipt of the second x-rays and second light; and a microcalorimeter array detector in optical communication with the sample and that receives the product x-rays from the sample.

Also disclosed is a process for performing x-ray spectroscopy, the process comprising: providing an x-ray spectrometer; producing the first x-rays; receiving, by the x-ray optic, the first x-rays from the x-ray plasma source; focusing, by the x-ray optic, the first x-rays; producing, by the x-ray optic, the second x-rays; communicating the second x-rays to the sample; receiving, by the sample, second light; producing product x-rays in response to receipt of the second x-rays and the second light; and receiving, by the microcalorimeter array detector, the product x-rays from the sample to perform x-ray spectroscopy.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

Figure 1:
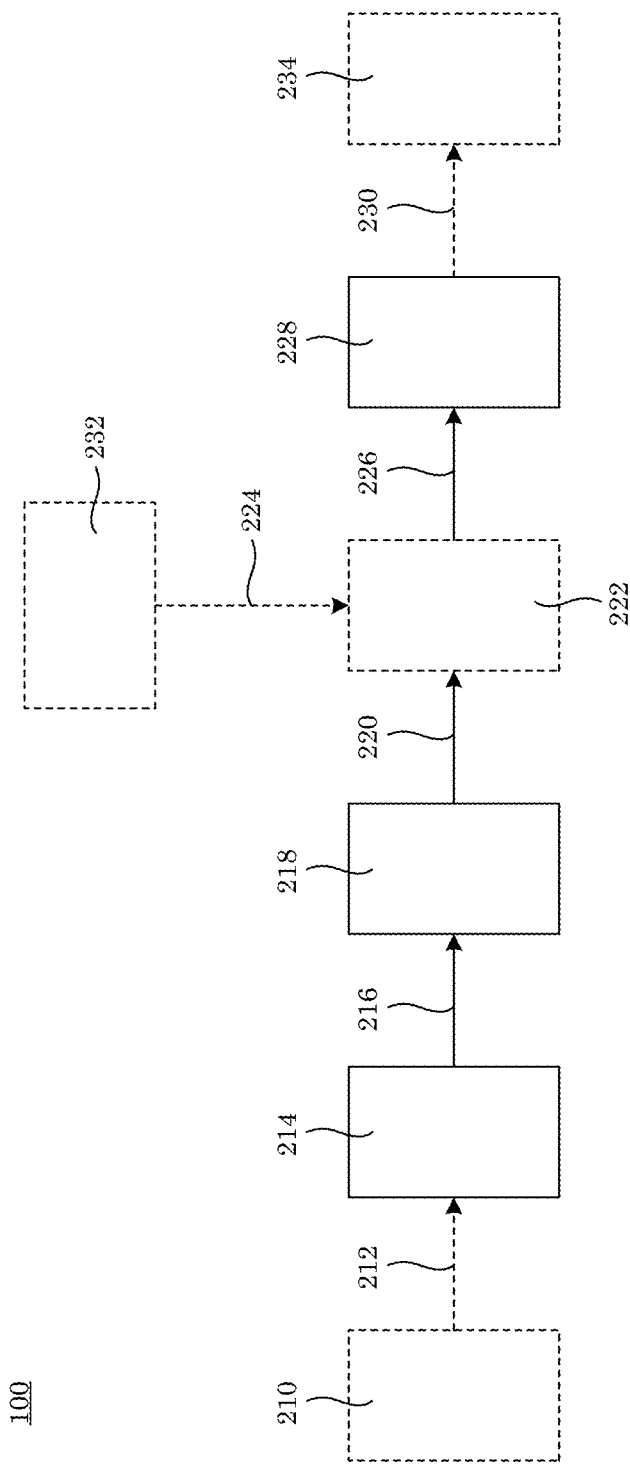
FIG. 1 shows an x-ray spectrometer.

In an embodiment, with reference to FIG. 1, x-ray spectrometer 100 includes x-ray plasma source 214 that produces first x-rays 216; x-ray optic 218 in optical communication with x-ray plasma source 214 and that: receives first x-rays 216 from x-ray plasma source 214, focuses first x-rays 216 to produce second x-rays 220, and communicates second x-rays 220 to sample 222 that produces product x-rays 226 in response to receipt of second x-rays 226 and second light 224; and microcalorimeter array detector 228 in optical communication with sample 222 and that receives product x-rays 226 from sample 222.

According to an embodiment, x-ray spectrometer 100 includes second light source 232 in optical communication with sample 222 and that produces second light 224 and communicates second light 224 to sample 222, wherein sample 222 produces product x-rays 226 in response to receipt of second x-rays 220 and second light 224.

In an embodiment, x-ray spectrometer 100 includes first light source 210 in optical communication with x-ray plasma source 214 and that produces first light 212 and communicates first light 212 to x-ray plasma source 214, wherein x-ray plasma source 214 produces first x-rays 216 in response to receipt of first light 212.

In an embodiment, x-ray spectrometer 100 includes analyzer 234 in electrical communication with microcalorimeter array detector 228 and that receives detector signal 230 from microcalorimeter array detector 228.

In an embodiment, x-ray spectrometer 100, analyzer 234 determines an x-ray spectrum of sample 222 from detector signal 230.

Figure 2:
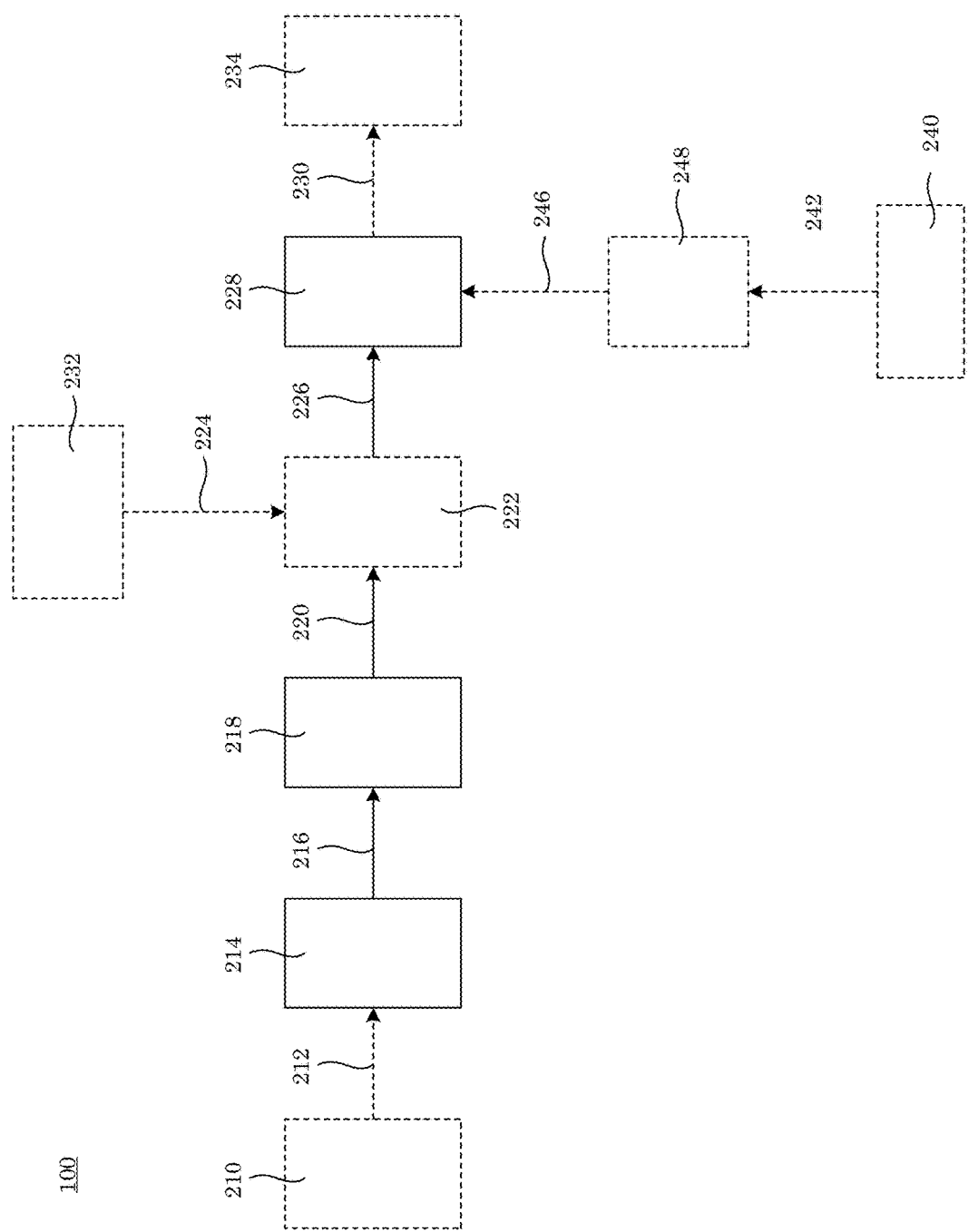
FIG. 2 shows an x-ray spectrometer.

In an embodiment, with reference to FIG. 2, x-ray spectrometer 100 includes reference x-ray source 240 and calibrant target 248 in optical communication with microcalorimeter array detector 228, wherein calibrant target 248 produces second reference x-rays 246 in response to receipt of first reference x-rays 242 from reference x-ray source 240.

In an embodiment, x-ray spectrometer 100 includes reference x-ray source 240 in optical communication with calibrant target 248 and that produces first reference x-rays 242.

It is contemplated that first light source 210 can include a pulsed laser possibly with additional amplification stages. A commercial Ti:sapphire laser and commercial amplification stages were included as light sources.

In x-ray spectrometer 100, first light 212 can include short duration laser pulses. A 35-femtosecond duration pulse of 800 nm light can be used with a 1 kHz repetition rate and an energy of 12 mJ/pulse.

In x-ray spectrometer 100, x-ray plasma source 214 can include a small chamber containing a vertical jet of deionized water. Here, a water jet can have a diameter of 100 microns. First light 212 was focused at an edge of the water jet to produce pulses of first x-rays 216 with the same repetition rate as first light 212. The chamber was evacuated using a scroll pump. The water jet was produced using a 100 μm pinhole aperture separating an enclosed volume from the chamber. Water was supplied to the enclosed volume via tubing that connected to one external reservoir, and water was collected in a separate external reservoir by tubing that connected to the chamber via a drain port. The chamber had optically transparent windows for the first light 212 to enter and exit. The chamber had a window for first x-rays 216 to exit. The window included polyimide-based tape and thin aluminum foil to reflect scattered first light 212. The chamber had an additional window for x-rays to exit for diagnostic measurements. The chamber was aluminum with external layers of steel and lead to prevent x-rays from exiting except at intended locations. The chamber was mounted on mechanical translation stages so that the water jet could be aligned to the first light 212.

In x-ray spectrometer 100, first x-rays 216 can include broadband x-ray emission up to energies of 15 keV.

In x-ray spectrometer 100, x-ray optic 218 can include a x-ray device that collects x-rays from one point and focuses them at a second, distant point. X-ray optic 218 can be a focusing polycapillary. The x-ray optic 218 was mounted on translation stages so that it could be aligned to the intersection of the water jet and the first light 212.

In x-ray spectrometer 100, second x-rays 220 can include first x-rays 216 modified by the transmission function of the x-ray optic 218. Second x-rays were focused to an 80-um diameter spot by the x-ray optic 218.

In x-ray spectrometer 100, sample 222 can include solid or liquid materials whose properties are to be studied using the x-ray spectrometer 100. Sample 222 can include a liquid jet containing materials of interest in solution. The jet was created by discharging liquid through a cylindrical steel tube connected to flexible tubing and a pump. Pressure was created on one side of the tube using commercial gear and peristaltic pumps. After leaving the tube, liquid was captured in a drain and recirculated using the same pump. The sample 222 interacted with the second x-rays 220 and second light 224 in the region after leaving the tube and before capture and recirculation. In our proofs of principle, the liquid jet had a diameter of 100 um. To increase the interaction length of the jet with the second x-rays 220, the jet propagated in the same direction as the second x-rays 220 except for a 10-degree angular offset.

In x-ray spectrometer 100, second light 224 can include pulses of laser light that initiate photoactivity or photochemistry in the sample 222. The second light 224 and first light 210 can be synchronized in time. By establishing different and adjustable path lengths in the apparatus, the second x-rays 220 can arrive at the sample 222 a known and adjustable time delay after the second light 224 so that the x-ray measurement is indicative of the state of the sample 222 at a known time after its photoexcitation. The wavelength, intensity, shape and duration of the second light 224 can be modified by optical elements to provide various types and amounts of photoactivity. The 800 nm pulses from the first light source 210 were converted to 400 nm pulses for the second light 224 using a crystal of beta barium borate.

In x-ray spectrometer 100, product x-rays 226 can include x-rays emitted by the sample 222 or second x-rays 220 transmitted through the sample 222.

In x-ray spectrometer 100, microcalorimeter array detector 228 can include cryogenic microcalorimeter sensors operating at sub-Kelvin temperatures. These energy-dispersive elements can measure the energies of individual x-rays with eV-scale precision by transducing deposited energy to electrical signals. This level of precision is sufficient to reveal the state of the material in the sample 222. The precision is derived from the sub-Kelvin operating temperatures and the sensitivity of the microcalorimeter device. An array containing numerous separate microcalorimeters provides increased area to collect the product x-rays 226 and the ability to measure numerous x-rays during a single pulse of product x-rays 226. The microcalorimeter sensors can include superconducting transition-edge sensors. The microcalorimeter array detector 228 also contains a sub-Kelvin refrigerator with windows that transmit x-rays but not infrared radiation as well as readout circuitry to amplify the electrical signals from the sensors. Time-division superconducting quantum interference device multiplexer readout circuitry provided signals from 240 transition-edge sensors to be transmitted from the sub-Kelvin stage to room temperature on eight output channels.

In x-ray spectrometer 100, detector signal 230 can include information for the response of the elements in the microcalorimeter array 228 to absorbed product x-rays 226. This information can be encoded electrically or optically as well as in analog or digital format.

In x-ray spectrometer 100, second light source 232 can be the same pulsed laser as the first light source 210 in order to ensure time synchronization of the first light 212 and second light 224. A beam splitter can be used to define separate first and second light paths from a single light source.

In x-ray spectrometer 100, analyzer 234 can include electronic hardware or software to convert information 230 that describes the response of the microcalorimeter array 228 to absorbed product x-rays 226 into calibrated x-ray energy values. These x-ray energy values can be used to determine the photoactivity or photochemistry of the sample 222. The analyzer 234 can also correct the energy values for instrumental gain drift and reject or correct energy values distorted by event pile-up in the detector 228.

In x-ray spectrometer 100, reference x-ray source 240 can include an x-ray tube.

In x-ray spectrometer 100, first reference x-rays 242 can include a broadband x-ray spectrum produced by the reference x-ray source 240.

In x-ray spectrometer 100, calibrant target 248 can include components made from elements whose characteristic x-ray fluorescence after absorbing the first reference x-rays 242 occurs at energies useful for calibrating the microcalorimeter array detector 228. The calibrant target included an annular ring of material with the elements scandium, vanadium, manganese, iron, and cobalt. The product x-rays 226 passed through the central hole of the target to reach the microcalorimeter detector 228. The reference x-ray source 240 and calibrant target 248 were oriented so that the first reference x-rays 242 could not reach the microcalorimeter detector 228.

In x-ray spectrometer 100, second reference x-rays 246 can include fluorescent x-rays produced by the calibrant target 248 in response to the absorption of first reference x-rays 242. The second reference x-rays 246 were also absorbed by the microcalorimeter array 228 and used to energy calibrate the spectrum of product x-rays 226. The second reference x-rays could be distinguished from the product x-rays 226 because the product x-rays were synchronized in time with the first light source 210.

In an embodiment, a process for making x-ray spectrometer 100 includes providing first light source 210 (e.g., disposing first light source 210 on an optical bench); disposing x-ray plasma source 214 to be in optical communication with first light source 210 to receive first light 212 from first light source 210; disposing x-ray optic 218 in optical communication with x-ray plasma source 214 to receive first x-rays 216 from x-ray plasma source 214; disposing sample 222 in optical communication with x-ray optic 218 and second light source 232 to receive second x-rays 220 from x-ray optic 218 and to receive second light 224 from second light source 232; disposing microcalorimeter array detector 228 in optical communication with sample 222 to receive product x-rays 226 from sample 222; and disposing analyzer 234 in electrical or optical communication with microcalorimeter array detector 228 to receive detector signal 230 from microcalorimeter array detector 228.

X-ray spectrometer 100 has numerous beneficial uses, including performing static and time-resolved x-ray spectroscopies. In an embodiment, a process for performing for performing x-ray spectroscopy includes: providing x-ray spectrometer 100; producing first x-rays 216; receiving, by x-ray optic 218, first x-rays 216 from x-ray plasma source 214; focusing, by x-ray optic 218, first x-rays 216; producing, by x-ray optic 218, second x-rays 220; communicating second x-rays 220 to sample 222; receiving, by sample 222, second light 224; producing product x-rays 226 in response to receipt of second x-rays 220 and second light 224; and receiving, by microcalorimeter array detector 228, product x-rays 226 from sample 222 to perform x-ray spectroscopy.

The process for performing x-ray spectroscopy also can include: producing second light 224 by second light source 232 that is in optical communication with sample 222; communicating second light 224 to sample 222; and producing, by sample 222, product x-rays 226 in response to receipt of second x-rays 220 and second light 224.

The process for performing x-ray spectroscopy also can include: producing first light 212 by first light source 210 in optical communication with x-ray plasma source 214; communicating first light 212 to x-ray plasma source 214; and producing, by x-ray plasma source 214, first x-rays 216 in response to receipt of first light 212.

The process for performing x-ray spectroscopy also can include: receiving detector signal 230 from microcalorimeter array detector 228 by analyzer 234 in electrical or optical communication with microcalorimeter array detector 228.

The process for performing x-ray spectroscopy also can include: determining, by analyzer 234, an x-ray spectrum of sample 222 from detector signal 230.

The process for performing x-ray spectroscopy also can include: receiving, by calibrant target 248 in optical communication with detector 228, first reference x-rays 242; and producing second reference x-rays 246 by calibrant target 248 from first reference x-rays 242.

The process for performing x-ray spectroscopy also can include: producing first reference x-rays 242 from reference x-ray source 240 that is in optical communication with calibrant target 248.

In the process for performing x-ray spectroscopy, producing first x-rays 216 includes producing a stable x-ray flux over many hours. An x-ray camera can monitor x-ray flux from x-ray plasma source 214. The output of the x-ray camera can provide electrical control signals to mechanical stages that support the source for mechanical alignment between first light 212 and the water jet target within x-ray plasma source 214.

X-ray spectrometer 100 has numerous advantageous and beneficial properties. In an aspect, x-ray spectrometer 100 provides time-resolved x-ray emission spectroscopy using a tabletop-sized apparatus. Time resolution is better than 6 picoseconds.

In another aspect, x-ray spectrometer 100 provides the ability to perform time-resolved x-ray absorption spectroscopy using a tabletop-size apparatus. The time resolution of the spectrometer is better than 6 picoseconds.

X-ray spectrometer 100 advantageously and unexpectedly performs time-resolved emission and absorption spectroscopy. The physical location of microcalorimeter array detector 228 determines the operating mode and the location of the detector is quickly and easily changed.

In another aspect, x-ray spectrometer 100 provide time-resolved x-ray measurements including radiography, scattering, and diffraction by microcalorimeter array detector 228. Also, x-ray spectrometer 100 provides sensitivity to energy of individual detected photons.

The articles and processes herein are illustrated further by the following Examples, which are non-limiting.

EXAMPLES

Example 1. Ultrafast Time-Resolved Hard X-Ray Emission Spectroscopy on a Table Top This Example describes an x-ray spectrometer that provides monitoring atomic and electronic structure on ultrafast (fs-ps) timescales that can be used for investigating photophysical processes fundamental to light harvesting, photocatalysis, energy and data storage, and optical display technologies. Further, the x-ray spectrometer provides time-resolved hard x-ray (>3 keV) spectroscopy with elemental specificity and sensitivity to geometric and electronic structures. Additionally, the x-ray spectrometer can be a table-top apparatus that performs time-resolved x-ray emission spectroscopy. The time resolution of the x-ray spectrometer is better than 6 ps. The x-ray spectrometer includes a compact laser-driven plasma source with a highly efficient array of microcalorimeter x-ray detectors that provide detection of photoinduced spin changes in a polypyridyl iron complex, $[Fe(2,2'\text{-bipyridine})_3]^{2+}$ and measures lifetime of the quintet spin state. Results from the x-ray spectrometer show ultrafast hard x-ray emission spectroscopy is performed with 10 times better time resolution than provided by a synchrotron. The x-ray spectrometer provides results with a 100- to 1,000-fold increase in x-ray collection efficiency compared to conventional instruments and techniques.

Molecular complexes and nanomaterials containing transition metals are being extensively investigated for light harvesting, photocatalysis, energy and data storage, and optical display technologies. Many of these applications are inspired by the role of metal centers in photosynthetic light harvesting, charge migration, water oxidation, and hydrogen production. These technological and biological applications arise from the complex electronic structures of transition metal compounds. For example, photoinduced electron transfer and multi-electron chemistry are possible because of the existence of multiple stable oxidation states, whereas data storage and light-emission are enabled by photoinduced and spontaneous transitions between electron spin states, in spin-crossover and phosphorescent complexes, respectively.

The structure and dynamics of the chemical environment around the transition metal atom have major effects on the energetics and lifetimes of accessible states and on the crossings between them. The lifetimes of spin- and charge-transfer states, which range widely from femtosecond to microsecond timescales, are primarily determined by the coupling among electronic and nuclear degrees of freedom. Major research efforts are focused on optimizing properties of transition metal complexes for use in photochemical or photophysical applications. Generalizing, there are two main issues under scrutiny. The first concerns the fate of the state prepared by photon absorption within the excited state manifold. Due to the high density of electronic and spin states of transition metals compared to purely organic molecules, relaxation processes almost always involve multiple steps with interconversion of states that are both charge-transfer and ligand field in nature. For example, intersystem crossing involving several multiplicities—e.g., from singlet to quintet in $d^6$ Fe (II) systems—may occur in the initial relaxation dynamics of a single complex. The second issue under scrutiny is tied to the issue of ground state recovery, and involves questions of how much of the photon energy can be stored and for how long. Again, coupling to nuclear degrees of freedom, intersystem crossing events, and charge transfer phenomena are central to both understanding and ultimately controlling excited state lifetimes.

Many of these issues have been confronted in the context of numerous studies of Ruthenium (II) complexes for solar energy conversion. Part of their success is due to the energetic ordering of their excited states wherein the metal-to-ligand charge-transfer (MLCT) manifold (both singlet and triplet) resides below ligand field excited states that can serve as significant non-radiative relaxation pathways. Lifetimes of approximately 1 µs in room-temperature solvents are typical for the $^3$MLCT of $[Ru(bpy)_3]^{2+}$(bpy=2,2'-bipyridine). On the other hand, Fe(II) complexes have lower energy ligand field excited states leading to an extremely rapid deactivation of the MLCT states. As an example, the photoexcited $^{1,3}$MLCT manifold in $[Fe(bpy)_3]^{2+}$ is interconverted to a quintet metal center on sub-picosecond timescales with significant loss of excited state energy that might otherwise be exploited for redox processes.

The x-ray spectrometer provides a probe of the metal atom spin and electronic states on ultrafast timescales. Conventionally, optical pump-probe spectroscopies were used to study spin- and charge-transfer dynamics in metal complexes. However, changes in optical properties are often difficult to correlate with specific electronic or atomic configurations and many of the relevant spin and electronic states are optically silent. In contrast, hard x-ray spectroscopy techniques, while much less accessible, are element specific and highly sensitive to both atomic and electronic structure. One such technique, x-ray emission spectroscopy (XES), measures the spin and oxidation states of the absorbing atom while also being sensitive to electronic structure, local coordination, ligand type, and bond length.

Figure 3:
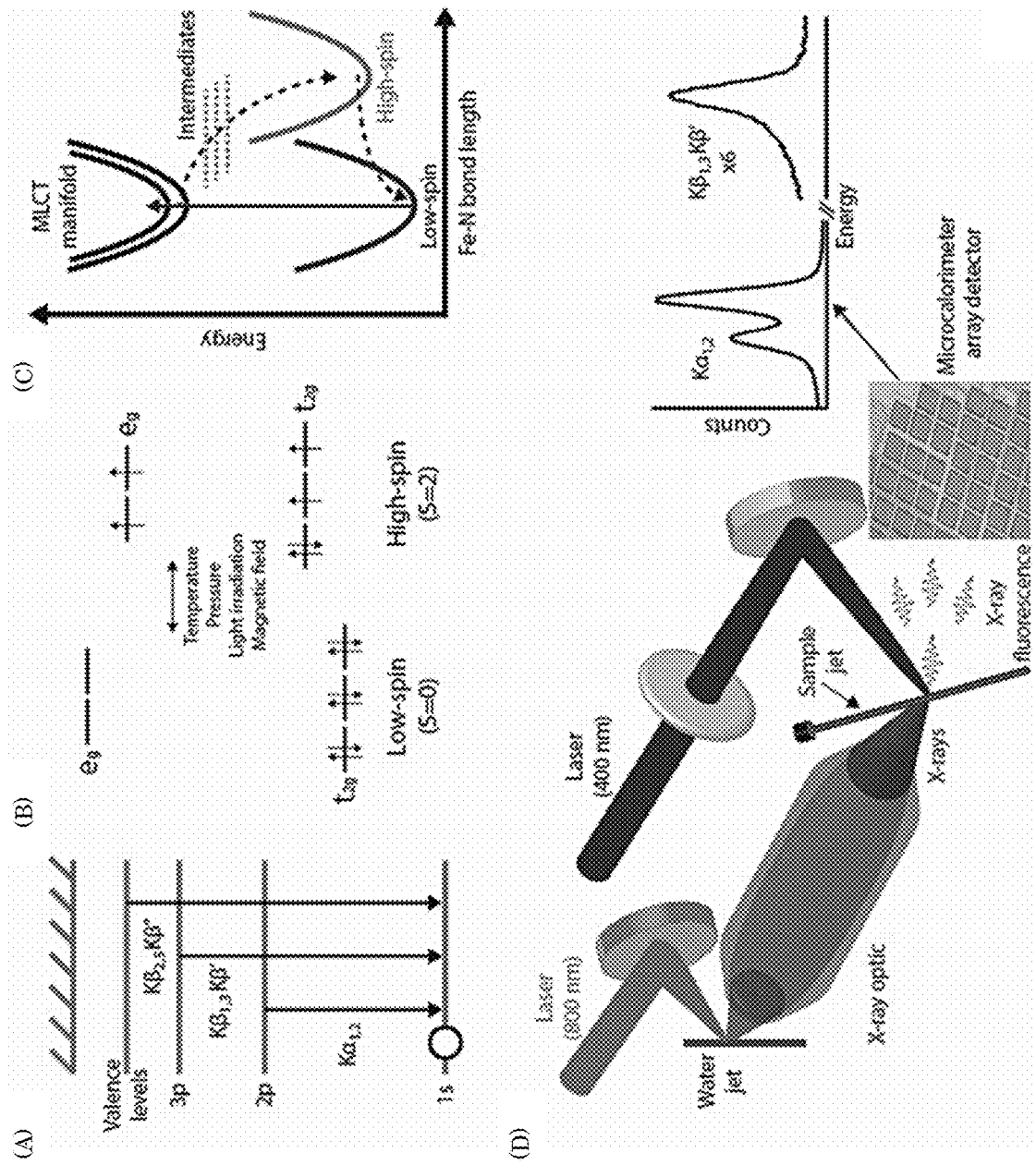
FIG. 3 shows (a) an energy level diagram for x-ray emission after photoionization of a is core electron. (b) Energy level schematic showing low-spin and high-spin states of the 3d orbital shell of Fe(II). (c) Schematic potential energy curves of Fe(II) complexes as a function of the Fe—N bond distance. (d) Experimental setup for TR-XES combining an ultrafast laser system, laser-driven x-ray plasma source, sample jet, and array of microcalorimeter detectors.

In non-resonant XES [see FIG. 3(a)], x-ray photons with energy greater than the binding energy of an inner-shell electron produce core-hole vacancies. These core-holes are quickly filled by the relaxation of less tightly bound electrons with concomitant x-ray fluorescence or emission. The Kα emission lines arise from 2p electrons filling is orbital vacancies, while the $Kβ_{1,3}$ and Kβ' emission lines result from 3p→1s is transitions. Additionally, the $Kβ_{2,5}$ and Kβ" lines result from transitions between the valence orbitals and is core holes. The main Kα and Kβ lines are sensitive to the spin state of the valence electrons via an electronic exchange interaction. Both theoretical and experimental studies have shown that XES is an ideal tool to probe the spin states of complex molecular systems and crystalline or amorphous materials.

XES can be applied to the study of so-called spin-crossover complexes. These molecules exhibit transitions between low-spin and high-spin states that can be induced by light, magnetic fields, temperature, or pressure [FIG. 3(b)]. Spin is an attractive state variable for information processing in molecular electronics and knowing the timescale for spin crossover in low-spin Fe(II) complexes is important for their application in dye-sensitized solar cells. To study the dynamic behavior of spin states, time-resolved XES (TR-XES) may be implemented in a "pump-probe" scheme, where an optical laser pulse first induces a spin transition in a sample and a subsequent x-ray pulse probes the evolution of the spin state. The ultimate time resolution of these pump-probe techniques is set by the duration of the pump and probe pulses and the stability of their synchronization. Data collection is aided by intense exciting x-ray beams and detectors with excellent energy resolution that can collect a large fraction of the emitted x-rays.

While ultrafast x-ray spectroscopies are uniformly challenging, TR-XES is especially photon-starved. As explained above, the signal of interest in XES is contained in secondary x-rays fluoresced isotropically by the exciting x-ray beam, rather than in perturbations to the exciting beam itself. Reliance on diverging secondary x-rays reduces the available signal by several orders of magnitude. The secondary x-ray yield is proportional to the incident x-ray flux but short x-ray pulse durations are often achieved at the expense of reduced flux. The difficulty of TR-XES is compounded by the need to measure the energy of the fluoresced photons with few-eV accuracy or better. Although crystal spectrometers can provide this level of accuracy, they are intrinsically inefficient. As a result of these challenges, TR-XES measurements are currently restricted to a small number of large facilities because only these facilities provide exciting x-ray pulses that are both sufficiently short and sufficiently intense. The time resolution of experiments performed at synchrotrons is set by characteristic electron-bunch lengths of 60-120 ps. Slicing beamlines at synchrotrons produce ~100 fs x-ray pulses and have been used to perform transient x-ray absorption measurements with sub-picosecond time resolution. However, the slicing process reduces the available x-ray flux and we are unaware of any TR-XES measurements at sliced beamlines. TR-XES experiments with time resolution better than 60 ps have been performed only at the LCLS and SACLA free-electron laser facilities where sub-100 fs resolution is possible. In the laboratory, static XES measurements are possible but measurements of ultrafast behavior have been stymied by the limited intensity of laboratory x-ray sources with suitable pulse duration and the limited collection efficiency of high resolution x-ray spectrometers.

With regard to the x-ray spectrometer, the x-ray spectrometer is a table-top apparatus that performs TR-XES measurements with sub-6 picosecond time resolution. The x-ray spectrometer measures spin dynamics in $[Fe(bpy)_3]^{2+}$, an archetypal spin crossover complex. As shown in FIG. 3(d), the x-ray spectrometer includes a Ti:Sapphire laser with two output beams, a laser-driven x-ray plasma source, a polycapillary x-ray optic, a sample jet, and an array of microcalorimeter detectors. The 800 nm light from one laser output is focused onto a cylindrical water jet generating broadband Bremsstrahlung x-ray radiation. The polycapillary optic collects and refocuses x-rays onto a nominal 80 µm-diameter full-width-at-half-maximum (FWHM) circular spot. The sample is a 50 mM aqueous solution of [Fe(bpy)$_3$]Cl$_2$ in a 100 µm-diameter circular jet angled at 10° with respect to the probing x-ray beam. The sample is pumped with 400 nm light generated by frequency doubling the second output of the Ti:Sapphire laser. Finally, the detector plane of the microcalorimeter array is positioned 75 mm from the sample and roughly 10° out of the path of the probing x-rays.

Hard x-ray XES is typically performed with wavelength-dispersive x-ray spectrometers that are based on Bragg diffraction. When a spatially extended crystal is used to intercept more of the isotropically emitted x-rays, the crystal must be curved to direct x-rays of a given energy to a detection point. The pliability of individual crystals is finite and the use of many separate crystals poses an alignment challenge. As a result, there are limits to both the collecting area of crystal spectrometers and their ability to approach a point source. In contrast, the x-ray spectrometer is based on an energy-resolving spectrometer with significantly different limits on collection efficiency and energy resolution. To compensate for the limited exciting flux from the laser plasma source, the x-ray spectrometer includes an array of 240 superconducting transition-edge microcalorimeters cooled to 0.115 K to suppress thermal and electrical noise. The array provides an active detection area of 23 mm$^2$, is located only 75 mm from the probed region of the sample, and provides few-eV energy resolution at hard x-ray energies. Thus, it provides both a large collecting area and acceptable energy resolution. Additional details are given in Section IV.C. The combination of a laser plasma source and microcalorimeter array has previously been proposed for time-resolved absorption spectroscopy and used to obtain static absorption and emission spectra, but the results presented here show time-resolved x-ray spectroscopy.

The measurements described here were performed on the molecular iron(II) complex [Fe(bpy)$_3$]$^{2+}$ which undergoes metal-to-ligand charge transfer and a transition from a low-spin (LS) ground state to a high-spin (HS) excited state following the absorption of 400 nm light. Spin crossover is accompanied by significant changes in molecular geometry [see FIG. 3(c)]. A recent TR-XES measurement at the LCLS has provided evidence that after photoexcitation from the LS singlet state into MLCT states, [Fe(bpy)$_3$]$^{2+}$ relaxes into the HS quintet state via a triplet intermediate. Hence, [Fe(bpy)$_3$]$^{2+}$ is a system for the demonstration of in-laboratory TR-XES.

Figure 4:
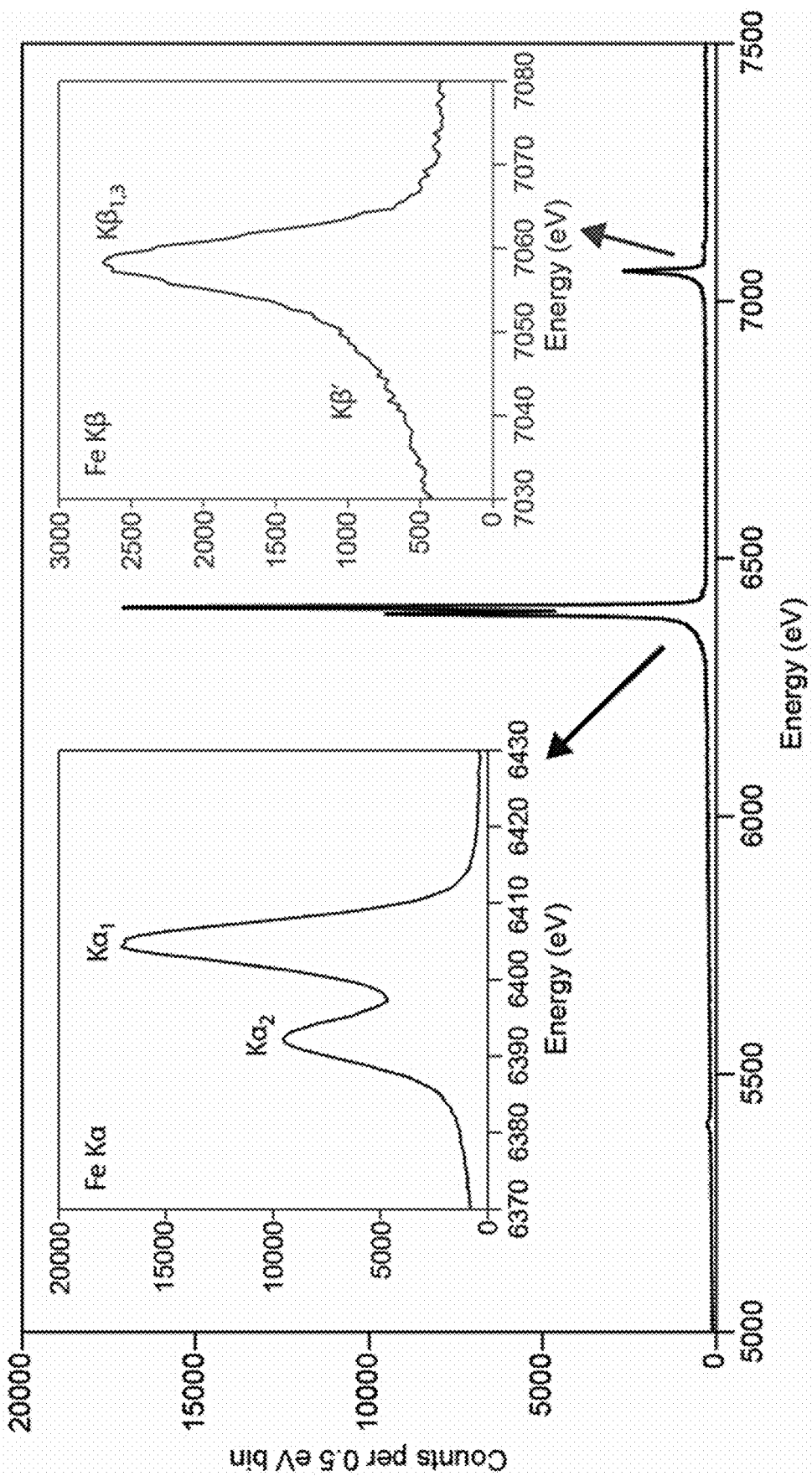
FIG. 4 shows an X-ray emission spectra (XES) from [Fe(bpy)$_3$]2+. The XES features are characteristic of a low-spin Fe state. The insets show Kα and Kβ regions. The energy resolution of the detector in the Kα region is 5.2 eV FWHM. The detector resolution in the Kβ region is less well determined, but is near 5.5 eV.

Initially, the x-ray spectrometer measured the ground state XES spectrum of [Fe(bpy)$_3$]$^{2+}$ (see FIG. 4). The recorded XES spectrum is in excellent agreement with reference data and includes the characteristic low-spin iron Kα and Kβ peaks in addition to a low-level background from the exciting x-ray source. This background is due to photons from the x-ray source that scatter off air or the sample jet into the detector. Therefore, the spectral shape of the background matches the energy distribution of our broadband x-ray source. FIG. 4 shows broadband response of microcalorimeter array detectors. Since we are not using any energy selecting or dispersing elements, e.g., Bragg crystals, the recorded spectrum contains x-rays with energies from 3 keV up to 15 keV. The insets in FIG. 4 present a closer look at the Fe Kα and Kβ spectral regions. We note that the Kα and Kβ spectra were acquired simultaneously and that emission lines from multiple elements in more complex compounds could also be acquired simultaneously. The energy resolution of the detector in the Kα region is 5.2 eV, whereas the energy resolution in the Kβ region is less well determined, but is near 5.5 eV.

Figure 5:
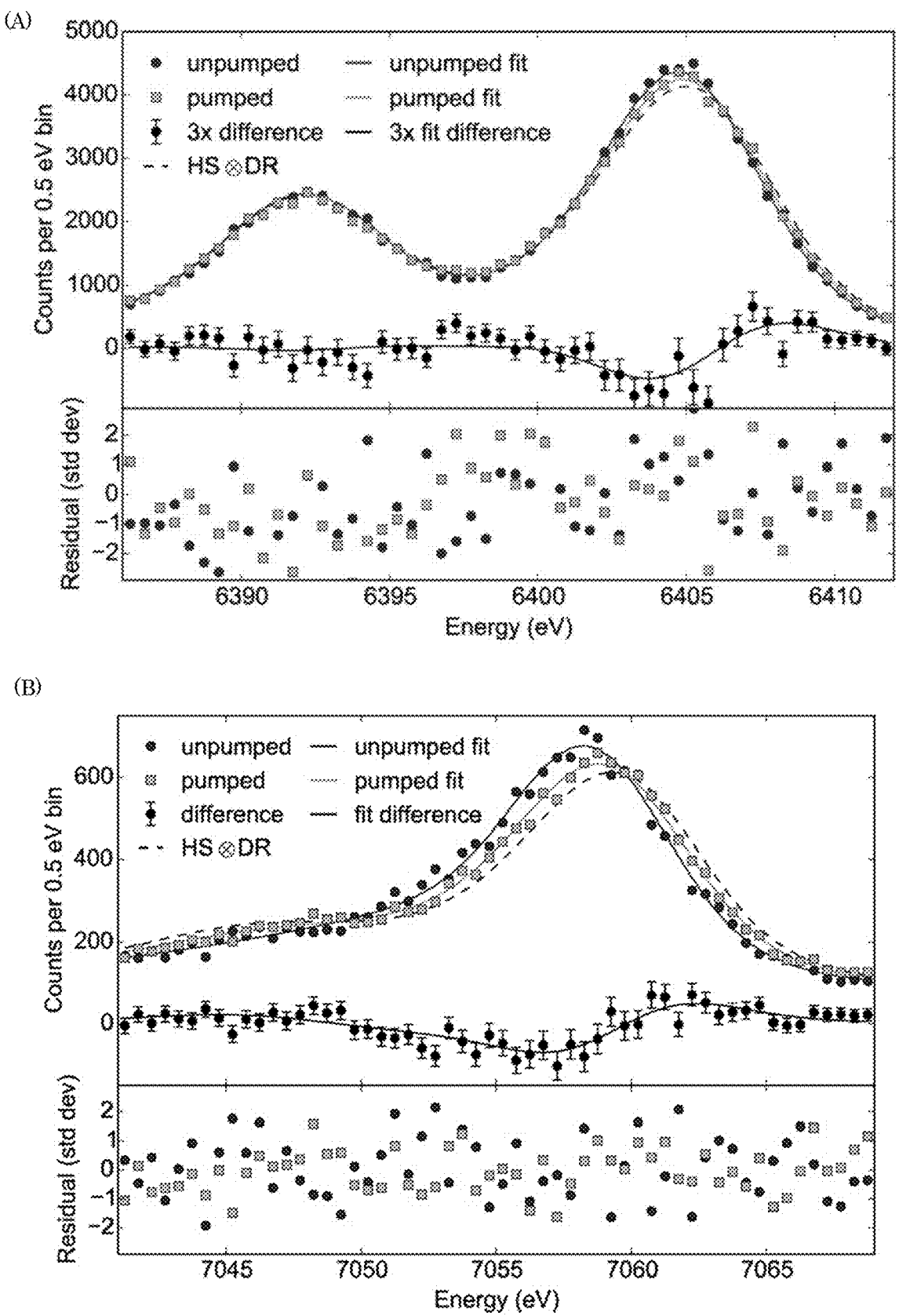
FIG. 5 shows X-ray emission spectra of [Fe(bpy)$_3$]$^{2+}$ less than 6 ps after photoexcitation. (a) Fe Kα. (b) Fe Kβ. Pumped and unpumped measurements are shown as red and blue markers, respectively. The dashed black lines are the reference high-spin spectra convolved with the detector response (DR) function. The solid red and blue curves are fits to the data that use a linear combination of high-spin and low-spin reference data convolved with the DR. The black markers show the difference between the pumped and unpumped data with one-standard-deviation error bars. The solid black line is the difference between the two fit curves. The lower axes show residuals between the data and the two fit curves. Error values are calculated assuming Poisson statistics in each energy bin. This data set was acquired over 12.5 hours of integration.

FIG. 5 shows both pumped and unpumped Fe Kα and Fe Kβ emission spectra of aqueous [Fe(bpy)$_3$]$^{2+}$ obtained with the x-ray spectrometer. For the pumped measurement, the time delay between pump and probe was less than 6 ps. FIG. 5 also shows fits that were used to determine the fraction of the sample that was in the high-spin state. We fit the spectra with a weighted sum of reference HS and LS spectra convolved with a detector response function. The pumped spectrum in FIG. 5(a) shows a decrease in the Kαi peak intensity compared to the unpumped spectrum. In FIG. 5(b), the pumped spectrum clearly shows the Kβ$_{1,3}$ peak decreasing in intensity and shifting to higher energy, while the weaker Kβ' feature becomes slightly more intense. These spectral changes are characteristic of a transition from LS to HS states.

Figure 6:
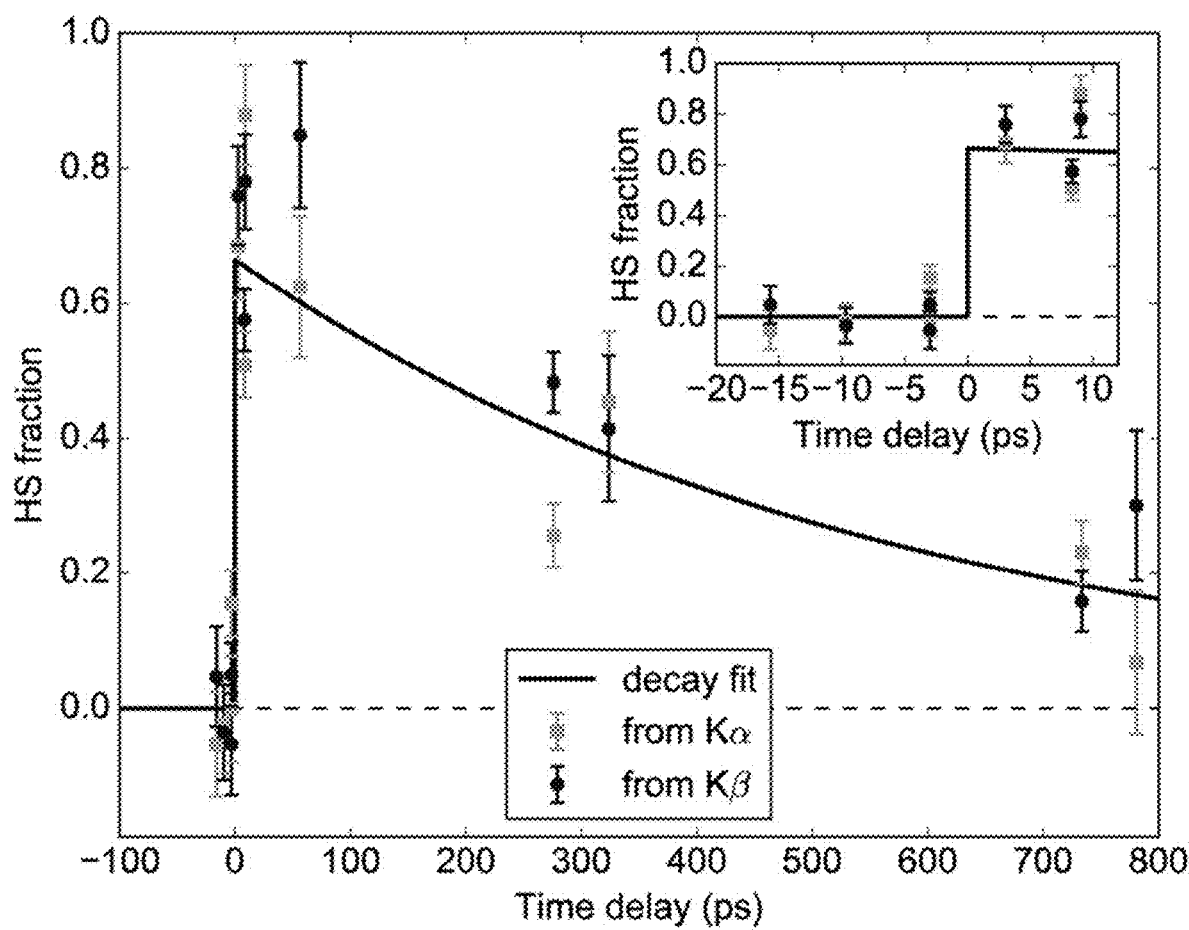
FIG. 6 shows time evolution of high spin (HS) fraction. Values for the HS fraction in optically excited [Fe(bpy)$_3$]$^{2+}$ obtained from measurements of Fe Kα and Kβ spectra plotted versus time. A single-exponential fit to the HS fraction yields a decay-time constant of 570±100 ps. Inset shows a zoom into HS fraction at short time delays. Time zero was chosen to lie half way between the two time points exhibiting the largest change in a measurement with 6 ps spacing between delays.

FIG. 6 shows the time evolution of the HS quintet fraction deduced from the Kα and Kβ spectral features measured at several time delays. Our data show a fast rise (see inset) of the HS fraction at time zero, followed by an exponential decay (see main figure) with a time constant of 570±100 ps. This time constant is consistent with the previously reported quintet lifetime of 665 ps. When the Kα and Kβ data points are fit separately, the two results for the HS lifetime are statistically indistinguishable: 504±156 ps and 612±117 ps, respectively. Hence, the two-line complexes provide equivalent information in this experiment. Additional details are provided in Appendix E.

With regard to excluding the triplet state, photoexcited [Fe(bpy)$_3$]$^{2+}$ reaches the HS quintet state via a triplet intermediate. When the pumped spectrum in FIG. 5 is fit to reference data for the triplet state rather than the quintet, we obtain an unphysical excitation fraction of 1.6±0.1. Hence, we can exclude the presence of a substantial triplet population at this time in the photoreaction. The absence of a triplet population is consistent with evolution to the quintet state that is complete on sub-ps timescales.

With regard to time resolution, time resolution of measurement with the x-ray spectrometer involves aspects of three design choices made in favor of shortened integration times. First, the use of a high-efficiency polycapillary x-ray optic introduces a temporal broadening of ~1.6 ps due to internal path length differences. Second, we inserted a fused silica rod in the pump path to increase the duration of the 400 nm pulse from 40 fs to 1.3 ps. Longer pump pulses experience less nonlinear absorption and increase the fraction of sample converted to the high-spin state. Finally, the combination of orthogonal interaction between x-rays and the pump beam and the size of the interaction region result in a temporal broadening of about 1.5 ps. Addition of these contributions in quadrature gives a predicted temporal resolution of 2.5 ps. To corroborate this calculation, we performed TR-XES measurements with a temporal step size of 6 ps around time-zero as shown in the inset of FIG. 6. The transition from LS to HS states occurs between time steps, thus demonstrating time resolution better than 6 ps. Improvements in data collection should eliminate the need for the design compromises just described, thereby improving the time resolution. Ultimately, the temporal resolution is set by the duration of the pump and probe pulses. Before stretching, our 400 nm pump pulses are 40 fs while x-ray pulses as short as 100 fs have been achieved using an optimized laser plasma source. Therefore, the potential exists for an order of magnitude improvement in experimental time-resolution.

With regard to comparing the efficiency of photon usage to other measurements, we explored a metric for comparison of TR-XES systems that is based on the efficiency of photon usage. In particular, we compare how accurately a TR-XES system can measure the lifetime of a spin state with respect to the total number of x-ray photons delivered to the sample. A conventional TR-XES was used at beamline 7-ID of the Advanced Photon Source to measure quintet lifetime of [Fe(bpy)$_3$]$^{2+}$ to be 503±100 ps, with 95% confidence limits. The total acquisition time was around 12 hours and the exciting x-ray flux was 2×10$^{12}$ photons per second. Consequently, the total number of photons delivered to the sample during the complete time-resolved measurement was approximately 8.6×10$^{16}$. In experiments with the x-ray spectrometer, we measured the quintet lifetime of [Fe(bpy)$_3$]$^{2+}$ to be 570±100 ps, with 68% confidence. The total acquisition time was 191 hours and the exciting x-ray flux was 5×10$^6$ photons/second. Accordingly, the sample was exposed to a total of 3.4×10$^{12}$ photons. It can be seen that our results were achieved with a photon dose that was a factor of 2.5×10$^4$ lower, an advantage that could be critical for samples that are more radiation sensitive than [Fe(bpy)$_3$]$^{2+}$. Some differences between the two experiments should be considered to perform the fairest possible comparison of collection efficiencies. While the error figures in the two measurements are nearly identical, they correspond to different confidence levels. To reconcile the different confidence levels, the scaling of the error of the quintet lifetime with the number of delivered photons is needed. To determine this scaling, we conducted fits to subsets of the data shown in FIG. 6. This process suggests that the error scales as the number of counts to a power between −1 and −2 and, to be conservative, we choose −2. If we use this scaling law to estimate the number of exciting photons required to achieve a ±100 ps, 95% confidence level measurement of the quintet lifetime using our apparatus, then a factor of 4 more photons are needed in our measurement. In addition, the sample jet configuration in our experiment was more favorable for producing emission x-rays. The sample concentration and interaction length between the sample and x-ray beam in the work presented here were 50 mM (20 mM) and 450 μm (140 μm), respectively. These differences increase the absorption of the exciting x-ray beam and the production of emission x-rays by a factor of 13.5 in our work. The monoenergetic incident beam of the conventional system is more efficient at creating K-shell vacancies than the broadband source used in the x-ray spectrometer. Only 70% of the x-rays delivered to the sample in our experiment have sufficient energy to produce K-shell x-ray emission. Accounting for the various factors above, we estimate that the advantage in collecting efficiency of our apparatus over the prior work is $2.5 \times 10^4/4/13.5/0.7=660$. This improvement explains how the x-ray spectrometer has enabled TR-XES on a table top.

It is useful to compare the factor of 660 advantage in photon collecting efficiency determined above to first principles estimates based on detector properties such as solid angle and detection probability. A detailed comparison between microcalorimeter arrays and wavelength dispersive spectrometers currently used at synchrotron and free-electron laser facilities has been reported. In this analysis, the x-ray collecting efficiency of a microcalorimeter array similar to the one used in the x-ray spectrometer here was estimated to be 170 and 730 times larger than two conventional spectrometers with 16 and 5 dispersive crystals, assuming a 20 mm distance between the sample and the microcalorimeter array whereas the distance in our experiment was 75 mm. While the increased distance reduces the collecting efficiency of the microcalorimeter by a factor of 14, this effect is balanced by attenuation of the emitted photons within the wavelength dispersive instruments. For generality, this attenuation was not included in the estimates by others since it is small at x-ray energies above ~13 keV but it is significant at the 6.5-7 keV energies relevant here, even when a helium bag is used to reduce photon losses. The conventional spectrometer used in the prior work of contained a single crystal analyzer that subtends 0.05% of $4\pi$ sr. The predicted collecting efficiency advantage of the microcalorimeter instrument compared to this single crystal analyzer is a factor of almost 4600. Given the complexity of comparing such different experimental approaches, agreement to within an order of magnitude with the factor of 660 described in the previous paragraph is encouraging. To summarize this discussion, our results show that we can determine spin-state lifetimes with similar precision to measurements conducted at large facilities but using radiation doses to the sample that are between two and three orders of magnitude smaller.

Radiation damage alters the material under study and is a crucial issue when x-rays are used to probe biological materials. The utility of ever-brighter x-ray sources depends on the development of techniques to mitigate or avoid such damage. Proven techniques include cooling samples to cryogenic temperatures, rapid substitution of fresh sample material, and the use of x-ray pulses whose termination precedes the onset of damage. These efforts notwithstanding, overcoming radiation damage remains a critical challenge, with the heavily studied and biologically critical metalloprotein photosystem II providing a particularly salient example. Radiation damage is especially likely in XES and TR-XES because a large number of exciting x-rays are needed to produce the smaller number of isotropically emitted x-rays that comprise the signal of interest. Improving the efficiency with which emitted x-rays are collected reduces the number of x-rays that need to be delivered to the sample and thus is another technique for reducing radiation damage. As described above, the collecting efficiency of our x-ray spectrometer significantly improves on the state of the art. This improvement may ease the study of damage-prone materials in a range of measurement scenarios and especially for so-called photon-in, photon-out spectroscopies such as XES, Partial Fluorescence Yield X-ray Absorption Spectroscopy (PFY-XAS), and Resonant Inelastic X-ray Spectroscopy (RIXS) in which the signal of interest is contained in secondary x-rays produced by the probing x-ray beam. Improvements in photon collection efficiency are also beneficial for the study of trace or dilute specimens, where a future goal is the study of biological materials at in vivo concentrations.

There are a large number of studies on ruthenium complexes for solar energy conversion. Nevertheless, due to the rarity and price of ruthenium, a number of research groups have focused on extending MLCT lifetimes in Fe(II) systems mainly by modifying the ligand structure. The large body of work targeting longer-lived molecular systems illustrates the need for a measurement technique sensitive to spin and metal oxidation state with a time-resolution of a few ps. While x-ray free-electron laser facilities have the time-resolution necessary for resolving intersystem crossing dynamics, there are presently only two facilities in the world with these capabilities with very limited accessibility. There are also a small number of synchrotron facilities with beamlines suitable for TR-XES. Unfortunately, these beamlines have time resolutions of 60-100 ps, which prevents them from observing few-ps dynamics. In contrast, our TR-XES the x-ray spectrometer provides data for intersystem crossing dynamics with timescales of a few ps.

It should also be noted that longer time scales characterize dynamics in numerous metal-based systems, and our apparatus can readily access this domain. One area of interest involves systems where optical signatures that interrogate the metal center directly are weak. Emissive lanthanide ion species have photophysics that can be exploited in sensing, lighting, and laser technologies. Within such systems, phosphorescence involves radially contracted 4f-electron metal-centered states. Even without changing spin multiplicity, it is difficult to optically access the manifold of such states due to Laporte selection rules. To sensitize lanthanide ion phosphorescence, researchers rely on energy transfer phenomena originating from optically addressable ligand or antenna systems. In cases where these energy transfer partners are in close proximity, time constants can approach the few ns to 100 ps regime. Of particular interest will be systems where transition-metal containing chromophores comprise the antenna such that TR-XES can simultaneously monitor spin and oxidation state of the excitation energy donor at the same time as the lanthanide ion acceptor.

With regard to the x-ray spectrometer, the laser system is a commercial Ti:Sapphire amplifier delivering 800 nm, 35 fs, p-polarized pulses with 20 mJ/pulse at 1 kHz. We used a 60/40 beam splitter inside the laser enclosure to divide the beam into pump and probe arms. The probe arm is expanded with a 1:2 telescope and focused by a 90° off-axis parabolic mirror with an effective focal length of 10 cm. The p-polarized focused laser beam interacts at grazing incidence with a 100 µm diameter water jet in a vacuum chamber under a pressure of 8-9 Torr. The interaction between the laser pulse and the water jet produces a plasma close to the water surface. The electric field of the driving laser pulse accelerates electrons in the plasma and when the energetic electrons encounter the water jet, x-rays are generated. The x-rays are emitted into a full 4π solid angle, so we use a polycapillary x-ray optic to collect x-rays from the source and refocus them onto the sample. The nominal focused spot is 80 µm, containing an approximate x-ray flux of $4 \times 10^6$ photons/s. To compensate for drifts in the pointing of the 800 nm beam, the water jet chamber is shifted automatically to maintain a steady x-ray flux. The x-ray flux is measured using a commercial x-ray CCD camera. The output of the CCD is routed to a computer where a software routine is active that drives a motorized stage that hosts the water jet. This feedback system maintains a stable x-ray flux over many hours.

The 800 nm pump beam path includes a computer controlled delay stage and a mechanical chopper running at 500 Hz. The pump beam is then doubled in frequency using a 200 µm thick BBO crystal. In order to increase the 400 nm pulse duration and the sample excitation fraction, we used an AR-coated 15.5 cm long fused silica rod. We used an 800 nm third-harmonic generation BBO crystal to perform a cross-correlation between the 800 nm pulse and the time elongated 400 nm pulse. Our measurement indicated that after traveling through the fused silica rod the 400 nm pulse duration was 1.3 ps. The beam then passes through two orthogonal cylindrical lenses resulting in a final spot size of 1000×300 µm at the sample jet location. The energy of the pump beam was approximately 900 µJ/pulse. The x-ray and 400 nm beams approach the sample jet orthogonal to each other. Since the x-ray probe pulses repeat at 1 kHz and the 400 nm pump pulses repeat at 500 Hz due to the chopper, the apparatus provides alternating measurements of the sample's dynamic and quiescent behavior. A pick-off photodiode in the pump arm responds to the 400 nm pulses and the output of the photodiode is encoded in the microcalorimeter data stream so that x-ray pulses are tagged as coming from the pumped or unpumped sample.

Figure 7:
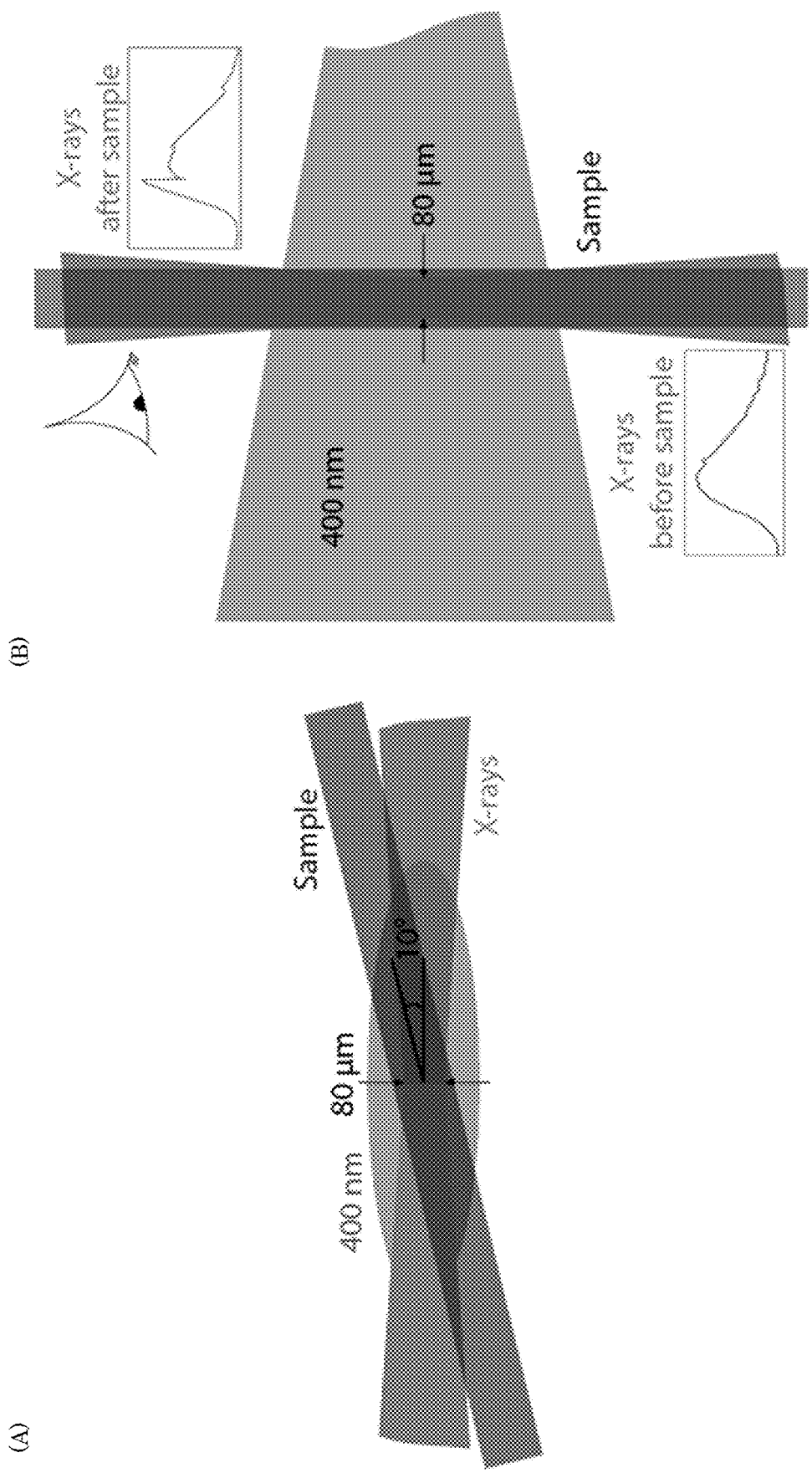
FIG. 7 shows x-ray, pump, and sample interaction region of an x-ray spectrometer. (a) Side view of the interaction region of the pump beam, x-ray beam, and the sample jet. The 100-μm diameter sample jet is angled 10° with respect to the central axis of the x-ray beam. The x-ray focus has a nominal diameter of 80 μm. The 400 nm pump beam is orthogonal to the other beams and therefore travels perpendicular to the plane of the page. The pump is focused using two orthogonal cylindrical lenses down to an ellipsoidal spot measuring 1000×300 μm. (b) Top view of interaction region. Since the 10° angle between x-rays and sample jet is measured with respect to the horizontal plane, the x-rays and sample jet overlap in this view. The small insets show notional x-ray spectra in photons versus energy before and after the sample jet. The sharp drop in the upper inset is due to the Fe K absorption edge. The observer symbol denotes the orientation of the microcalorimeter array.

The sample was circulated in a self-contained loop using a commercial peristaltic pump. In order to access the sample with the pump and probe beams, we used a 100 µm diameter free-space jet angled 10° with respect to the cylindrical axis of the polycapillary x-ray optic. With this geometry, the 400 nm beam encounters a 100 µm diameter cylinder of the sample, while the x-ray beam co-propagates with the sample and has an effective interaction length of 450 µm (see FIG. 7). After two cm of free-space travel, the sample jet enters a drain tube and the sample solution is recirculated to the high pressure side of the jet. The microcalorimeter array detector is located 75 mm away from the interaction region of the x-rays, 400 nm light, and sample jet and is rotated roughly 10° out of the path of the x-ray beam so that it collects x-rays emitted from the sample but not x-rays from the exciting probe pulses.

The x-ray spectrometer with microcalorimeter detector included 240 transition edge sensors (TESs), readout circuitry, and cryogenics to reach 75 mK. Each TES is a 350 µm×350 µm bilayer of molybdenum and copper with superconducting transition temperature ~115 mK, and a 4.12 µm thick bismuth layer to increase the x-ray stopping power.

The sensors are voltage biased into the superconducting-to-normal transition where their resistance is a strong function of temperature and hence deposited energy. The absorption of an x-ray results in a temperature change of ~1 mK, causing a transient resistance increase and current decrease that recovers in a few ms. The magnitude of the current transient increases with energy and provides energy resolution. The current pulses are amplified by three stages of Superconducting Quantum Interference Devices (SQUIDs) configured in a time-division multiplexing architecture so that the output signals emerge from the spectrometer on eight signal lines. Pulse signals from x-ray events are digitized, triggered, separated into discrete records of finite length, and stored at room temperature. At a later date, the record associated with each x-ray event is filtered and converted to energy. Cooling to 75 mK is provided by a commercial adiabatic demagnetization refrigerator that requires no liquid cryogens.

Data from each sensor is processed independently. To maximize the signal-to-noise, an optimal filter is built and applied to each trace to arrive at a pulse height in arbitrary units. The Fe Kα and Kβ complexes are identified and used to convert the arbitrary pulse heights to initial energy units. We regularly achieve about 5.2 eV FWHM energy resolution with this array at Fe Kα. The count rate per sensor is about 0.2 counts per second, which is well below the maximum counting rate of the instrument. Hence, use of a more intense x-ray probe beam will straightforwardly shorten the required counting times.

The fraction of molecules in the high-spin state in a given spectrum is determined by maximum likelihood fitting to a model function I(E) that describes the number of counts per unit of energy as a function of energy. The model functions are comprised of a low-spin reference spectrum, a high-spin reference spectrum, and a detector response function. The intensity I as a function of energy E is $$I(E) = A\left[(1-f) \cdot LS(E) + f \cdot HS(S) + \frac{c}{A}\right] \otimes DR$$

where A is the overall amplitude, f is the fraction of molecules in the high spin state, LS (HS) is the low (high) spin reference function, c is a constant background, and ⊗ indicates convolution. The detector response function DR(E) is $$DR(E) = e^{\frac{-E^2}{2\sigma^2}} \otimes \left[\frac{\chi}{\xi} e^{\frac{E}{\xi}} H(-E) + (1-\chi)\delta(E)\right]$$

which includes Gaussian broadening (where 2.355σ is the FWHM energy resolution) and an exponential tail containing a fraction χ of all counts and with energy scale ξ. The undesirable exponential tail is the subject of current research, and is believed to be caused by the population of long-lived metastable states in the bismuth absorber. H is the Heaviside function and δ is the Dirac delta function. When fitting single spectra, we allow for a possible energy shift $\Delta E_0$ and a possible linear stretch Θ in the energy calibration from its initial value. To minimize edge effects when convolving with our detector response model, we represent the reference data using sums of seven to nine Lorentzians.

It is useful to compare the peak excitation fraction of FIG. 4 to previous optical and x-ray measurements. For our pump pulse energy and spot size, the fluence is ~380 mJ/cm² and, on timescales short compared to the quintet lifetime, we observe an excitation fraction of 0.67±0.04. The excitation fraction depends on sample concentration and geometry as well as the wavelength, fluence, and duration of the pump pulse. For a closer point of comparison, we performed separate optical transient absorption (TA) experiments on [Fe(bpy)$_3$]$^{2+}$ wherein the ground state optical bleach at 532 nm was used to deduce the excitation fraction. These optical TA measurements were performed on a 100 μm thick flat jet containing 28 mM of [Fe(bpy)$_3$]$^{2+}$. The 400 nm pump pulses were chirped to about 700 fs, and, at the time of these experiments, the maximum achievable fluence was 230 mJ/cm$^2$. Under these conditions, we observed excitation fractions close to 0.45. We also observed that the excitation fraction depended less than linearly on fluence at this fluence range, complicating extrapolation of the excitation fraction to the fluence values used in the x-ray experiments. After accounting for the higher sample concentrations in the x-ray experiments, the cylindrical sample jet, and the dependence of excitation fraction on fluence in an approximate fashion, we predict an excitation fraction slightly above 0.4 for the conditions of the x-ray experiment. One possible explanation for the difference between the excitation fraction observed in our x-ray data and the excitation fraction extrapolated from optical measurements is the difference in the optical pump durations: 1.3 ps in the x-ray experiment and 700 fs in the optical measurements. A second possibility is the use of reference x-ray spectra from the literature rather than curves measured with our own apparatus. The response function is described as a 1 eV Gaussian. Any departure from this description will introduce bias to our fitting process.

The quintet lifetime and its error bar were determined by least squares fitting the excitation fractions in FIG. 4 to the function $$f(t) = H(t-t_0)F_0 e^{-\left(\frac{t-t_0}{\tau}\right)}$$

where time zero ($t_0$) was chosen to lie half way between the two points exhibiting the largest change in a measurement with 6 ps spacing between delays, $F_0$ is the maximum excitation fraction, and τ is the lifetime of the quintet. FIG. 6 includes results from every delay of every measurement cycle in which there were at least 15,000 counts in the Fe Kα complex. The total integration time is 191 hours.

The sample consists of 50 mL of deionized water containing 50 mM of [Fe(2,2'-bipyridine)$_3$]2+. An initial [Fe (bpy)$_3$]2+ sample was synthesized as follows: iron(II) sulfate heptahydrate (6.145 g, 22.1 mmol), 2,2'-bipyridine (10.3388 g, 66.2 mmol) and deionized water (150 mL) were added to a 250 mL borosilicate round-bottom flask open to air. The solution was stirred for two hours at room temperature and turned a deep purple indicating complexation. Excess NaCl was added to this solution and the solution was placed in a freezer overnight. The precipitate was filtered and washed with 0° C. water and diethyl ether and allowed to dry in air. The solid was recrystallized with hot water, forming deep purple crystals (yield: 13.270 g, 19.4 mmol, 88%). Synthesis of samples included multigram-scale quantities of the precipitate. These samples were then combined together and recrystallized to form over 50 g of the pure product. This large synthesis allowed the 50 mL [Fe(bpy)$_3$]$^{2+}$ solution in the experiment to be refreshed many times during the x-ray measurements.

Spatial overlap between the 400 nm pump and the x-ray probe is achieved by simultaneously maximizing transmission through a 100 μm tungsten pinhole oriented 45° with respect to each beam. Time zero is found to within 50 ps by observing the response of an avalanche photodiode to the x-ray probe and to the small amount of 800 nm light that arrives at the sample when the BBO crystal is removed. The sample jet is visually aligned to the cylindrical axis of the polycapillary optic by eye. Then, to achieve overlap of the x-rays, 400 nm light, and sample jet, the vertical position of the jet is chosen to minimize the 400 nm power reaching a detector on the other side of the jet and the horizontal position is chosen to maximize the x-ray count rate detected at the microcalorimeter array. During measurements, a range of diagnostic information is available to confirm that the system remains aligned. These diagnostics include the x-ray flux reaching a commercial x-ray CCD camera, the x-ray flux reaching the microcalorimeters, the 400 nm power after the sample jet, and two optical cameras imaging 400 nm light scattered from optical elements before and after the sample jet.

The microcalorimeter array was operated with a bath temperature of 75 mK in an adiabatic demagnetization refrigerator with a hold time of roughly 60 hours. After this interval, the detector package must be warmed to 3 K for another magnetization-demagnetization cycle lasting approximately two hours. The data in FIG. 5 was acquired as one of four delays over 50 hours in a single refrigerator cycle. The data in FIG. 6 was acquired over several cycles. Each time the refrigerator is recycled, the calibration of the detectors can change so we allow some analysis parameters to vary between refrigerator cycles and fix others as described below. The parameters χ=0.16 and ξ=25 eV are fixed from a fit to the Fe Kα complex in the unpumped data set with the highest number of counts with f=0. Extremely similar values for χ and ξ were observed in other spectra measured at other times. The parameters σ, $\Delta E_0$, Θ, and c are fixed for each cycle from a fit to the Fe Kα complex in the unpumped data with f=0. For each cycle and each time delay, A is fixed by a fit to the unpumped data taken during that delay, again with f=0. Finally, the pumped data for each cycle and time delay is fit with only f as a free parameter; we report f and the one standard deviation error bar from the fit. We repeat this procedure for the Kβ complex, but use the same values for χ and ξ as for the Kα complex and choose Θ=1 because Θ and σ are largely degenerate.

Example 2. Ultrafast Time-Resolved x-Ray Absorption Spectroscopy of Ferrioxalate Photolysis with a Laser Plasma x-Ray Source and Microcalorimeter Array The detailed pathways of photoactivity on ultrafast time scales are a topic of contemporary interest. Using a tabletop x-ray spectrometer based on a laser plasma X-ray source and an array of cryogenic microcalorimeter X-ray detectors, we measured a transient X-ray absorption spectrum during the ferrioxalate photoreduction reaction. With these high-efficiency detectors, we observe the Fe K edge move to lower energies and the amplitude of the extended X-ray absorption fine structure reduce, consistent with a photoreduction mechanism in which electron transfer precedes disassociation. We provide quantitative limits on the Fe—O bond length change.

Ferrioxalate [Fe$^{III}$(C$_2$O$_4$)$_3$]$^{3-}$ complexes exist in natural waters including aerosols. The photoreduction of ferrioxalate is often expressed as 2[Fe$^{III}$(C$_2$O$_4$)$_3$]$^{3-}$+hv→2[Fe$^{III}$ $(C_2O_4)_2]^{2-}+2CO_2+C_2O_4^{2-}$. This reaction produces $CO_2.^-$ radicals as intermediates that go on to initiate other chemical reactions. For example, it is thought that photolysis of these complexes is one of the main sources of active oxygen species (.OH, $HO_2.$, $H_2O_2$), where the formation of the species is catalyzed by $Fe^{II}$ and $Fe^{III}$ ions in Fenton-like reactions and this photolysis is responsible for the consumption of oxygen in natural waters. Ferrioxalate is also used as a chemical actinometer, providing a chemical method of measuring light intensity.

Figure 8:
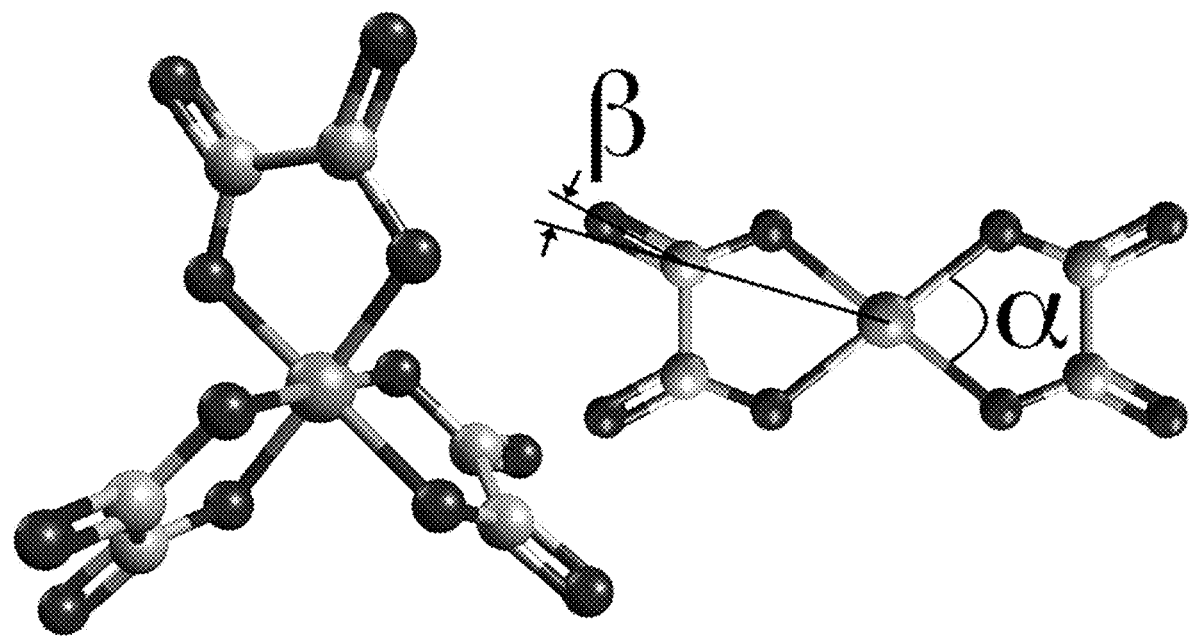
FIG. 8 shows a molecular structure of ferrioxalate [Fe$^{III}$(C$_2$O$_4$)$_3$]$^{3-}$ (left). Proposed intermediate [Fe$^{II}$(C$_2$O$_4$)$_2$]$^{2-}$ (right). Bond angles α and β, which are discussed in the context of fitting the EXAFS spectrum of ferrioxalate, are shown on the proposed intermediate structure for visual convenience.

Ferrioxalate can have two mechanisms by which photoreduction proceeds: (1) a prompt reduction mechanism that has $Fe^{II}$ intermediates, believed to be $[Fe^{II}(C_2O_4)_2]^{2-}+CO_2+CO_2.^-$ at 100 ps, and (2) a slow reduction mechanism that has $Fe^{III}$ intermediates, believed to be $[Fe^{III}(C_2O_4)_2]^-+2CO_2.^-$ at 100 ps. FIG. 8 shows the structure of ferrioxalate and the intermediate in the prompt case. An important component of the debate over the photoreduction mechanism in ferrioxalate is the observation of very different time-resolved X-ray absorption spectroscopy signatures by others.

X-ray absorption spectroscopy (XAS) is a powerful tool that enables element-specific measurements of electronic and geometric structure. The oxidation state of the absorbing element is revealed by a "chemical shift", meaning a translation of the absorption edge feature in energy. Geometric structure is studied by analyzing the extended X-ray absorption fine structure (EXAFS), which appears as oscillatory features in X-ray absorption over a few hundred eV span above an absorption edge. Time-resolved XAS, where X-ray absorption spectra are measured shortly after photoexcitation of the sample, is ideal for determining the oxidation state and structure of intermediate photoproducts in the photoreduction of ferrioxalate. Others report time-resolved XAS measurements showing a large reduction in the Fe—O bond length and do not discuss the edge shift. Others compare the Fe—O bond length in the intermediate product to the length measured in many Fe-containing compounds and find it to be more consistent with $Fe^{III}$ than $Fe^{II}$. Still others report time-resolved XAS measurements taken with the SACLA free electron laser that show little to no change in the Fe—O bond length and show a −4 to −5 eV edge shift within 140 fs. Some argue for $Fe^{II}$ intermediates based upon comparison of the observed edge shift to density function theory (DFT) calculations.

Here, we report independent time-resolved XAS measurements on $[Fe^{III}(C_2O_4)_3]^{3-}$ using the x-ray spectrometer with microcalorimeter array detectors. Our measurements were performed at a single delay, 100 ps, chosen because the previous work on $[Fe^{III}(C_2O_4)_3]^{3-}$ is in agreement that the time-resolved signals are largely unchanging in the 100 ps time range. Thus, we can easily compare to other results. We observe a −1.85±0.4 eV edge shift, and our data are inconsistent with the large negative bond length change reported by others. In a separate experimental study of Fe oxide compounds, edge features were found to appear 2-3 eV lower in energy for $Fe^{II}$ compared to $Fe^{III}$. Additionally, $Fe^{III}(CN)_6^{-4}$ reduces to $Fe^{II}(CN)_6^{-3}$ or $Fe^{II}[(CN)_5OH_2]^{-3}$ depending on the excitation wavelength, and time-resolved XAS measurements show edges shifts of −2 and −1 eV, respectively. The current confusion as to the mechanism of photoreduction in ferrioxalate has spread beyond the primary literature and into more general resources. Our results show that the photolysis of ferrioxalate proceeds with prompt reduction and $Fe^{II}$ intermediates.

Figure 12:
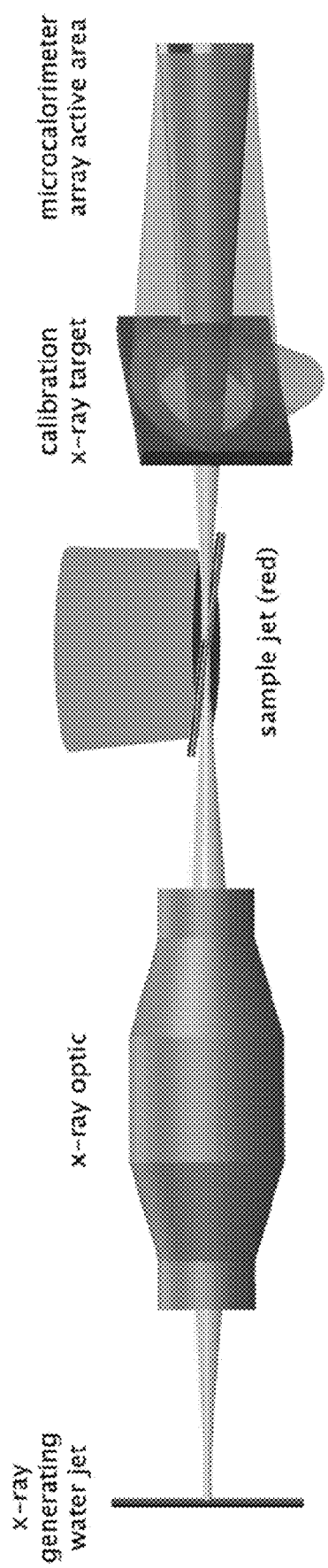
FIG. 12 shows an x-ray spectrometer in which x-rays (green) are generated by focusing 800 nm 8 mJ 40 fs pulses onto the x-ray generating water jet. Some of these x-rays are collected and focused by the x-ray optic. Sample is circulated by a peristaltic pump and passed through a stainless steel tube to create a liquid sample jet of nearly the same diameter and speed. The 400 nm pump beam and x-ray probe beams are focused onto the same location on the sample jet. X-rays transmitted through the sample pass through a hole in a calibration target, and are measured by the microcalorimeter array. Simultaneously, an x-ray source illuminates (translucent red) the calibration x-ray target, from which characteristic x-rays of many transition metals fluoresce (also translucent red). These x-rays are also measured by the microcalorimeter array, providing calibration information.

The measurement apparatus is shown in FIG. 12 and included a Ti:sapphire laser with two output beams, a laser-driven X-ray plasma source, a polycapillary X-ray optic, a sample jet, and a microcalorimeter array spectrometer. The 800 nm light from one laser output is focused on a water jet to generate broad-band bremsstrahlung X-ray radiation. X-rays are collected by a polycapillary optic and focused to a nominal 80 µm full width at half-maximum (fwhm) spot, where they interact with the sample. The array of microcalorimeter detectors is positioned behind the sample, collecting transmitted X-rays. The sample is a 440 mM aqueous solution of ferrioxalate in a 100 µm diameter circular jet angled at 50 with respect to the X-ray beam. The pump beam is generated by frequency-doubling the second output of the laser with a BBO crystal. The pump beam is 1 mJ/pulse of 400 nm light focused to a 950 µm×140 µm fwhm spot on the sample. The optical pump and the X-ray generating pulse have 40 fs duration. The X-ray probe pulse is expected to have ~1.6 ps duration due to unequal path lengths in the polycapillary optic.

While the laser and X-ray pulse generation operate at 1 kHz, an optical chopper reduces the repetition rate of the pump to 500 Hz so that the apparatus alternates between pumped and unpumped measurements on a shot-by-shot basis. We find spatial overlap between the X-ray beam and the pump by simultaneously optimizing transmission through a 100 µm hole in a piece of tungsten. Temporal overlap is found to ±50 ps with an avalanche photodiode. A delay stage was used to set the X-ray pulse to arrive 100 ps after the pump pulse excites the sample.

Microcalorimeter array spectrometers are energy-dispersive detectors in which energy sensitivity is achieved by measuring the temperature rise of a pixel following energy deposition by a discrete event, for example, a single X-ray photon. This type of detector can have very high detection efficiency, often 100 times that of a comparable wavelength-dispersive energy analyzer, and due to the low thermal noise at sub-Kelvin temperatures can have resolving powers of a few thousand at X-ray energies. Here, we use the world's largest microcalorimeter array, consisting of 240 transition edge sensors, with 23 mm² of active area. The x-ray spectrometer included a count rate for the array of ~5000 photons/s. The count rate was achieved by moving the detectors back to 115 mm from the sample and by reducing the laser power used to generate X-rays to about ⅓ the maximum power. The x-ray spectrometer with microcalorimeter arrays is an alternative to diffracting X-ray energy analyzers for tabletop ultrafast XAS.

Raw microcalorimeter data is converted to a spectrum of X-ray energies by offline analysis. In the raw data, individual X-ray events are represented by a transient current pulse, with larger-energy X-rays causing larger-magnitude current transients. The microcalorimeter array used here achieves a fwhm Gaussian energy resolution of 6.5 eV at the Co Kα line (6930 eV) at low count rates and somewhat poorer resolution during these measurements because of cross-talk in the readout system.

We collected data for 154 h over 8 separate days. A 1 L sample reservoir was used and replaced with a fresh sample every other day. In addition to static and time-resolved XAS measurements taken with the tabletop apparatus, we also made static XAS measurements of 300 and 600 mM samples of aqueous ferrioxalate at beamline BM20 of the Advanced Photon Source (APS).

Figure 9:
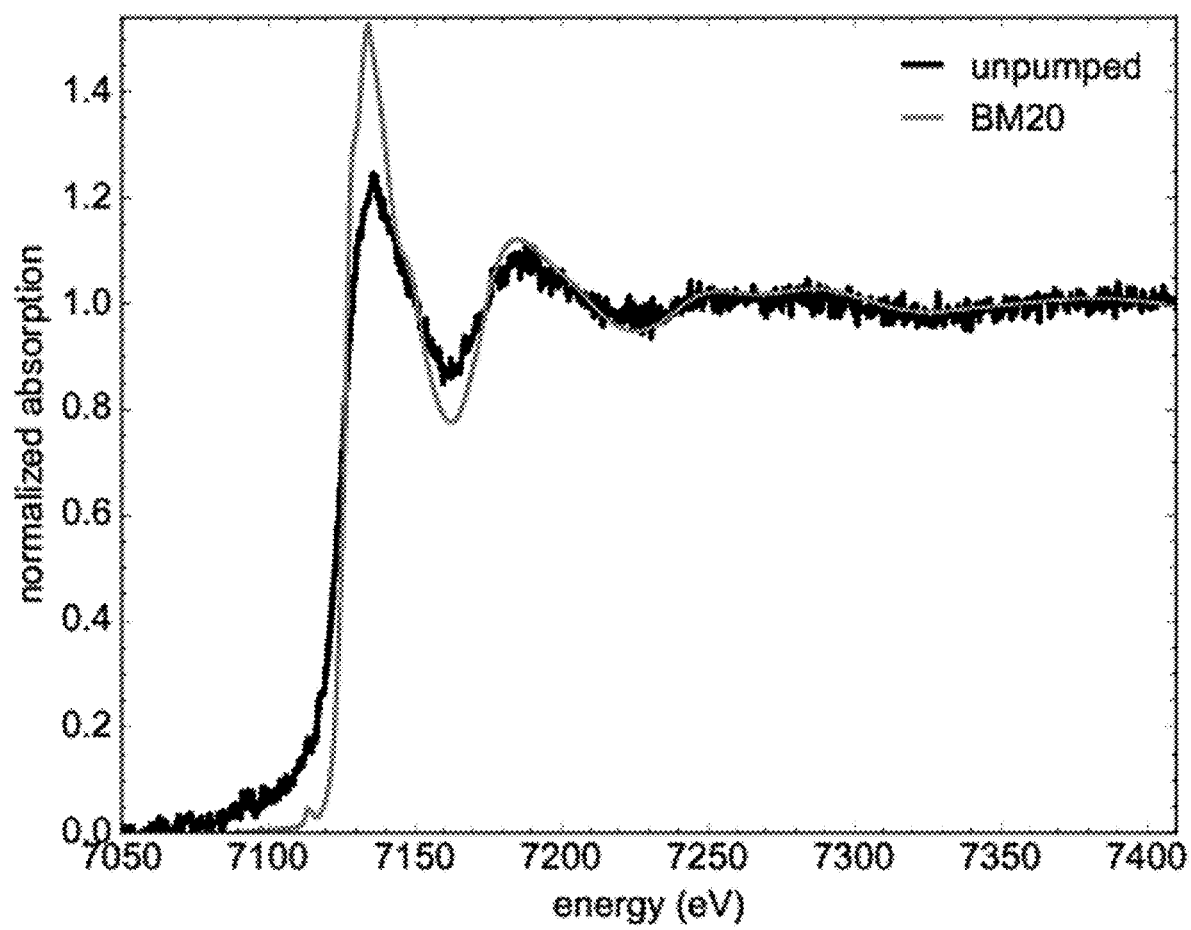
FIG. 9 shows a normalized X-ray absorption of ferrioxalate, from beamline BM20 at APS and from the unpumped microcalorimeter data. The three dominant effects causing the unpumped spectrum to appear different from the BM20 spectrum are (1) worse energy resolution, (2) the low-energy tail in the detector response function, and (3) a reduction in the EXAFS feature amplitude attributed to a second Fe species absorbing a fraction of the laser-generated X-rays. The third effect has the largest magnitude at energies above 7150 eV.

The ground-state EXAFS measurements from the unpumped spectrum and the BM20 spectrum are shown in FIG. 9. The data are normalized to a unit edge step, and the oscillatory fine structure, $\chi(k)$, where k is the photoelectron wavenumber, is isolated from the embedded atom background function. The embedded atom background, $\mu_0(E)$, represents the absorption cross section of the Fe atom in the potential of the ferrioxalate molecule but without perturbation from the atoms in the surrounding configuration. $\chi(k)$, then, is the function representing the interaction of the photoelectron with the atoms in the coordination environment. The Fourier transform of this function, $\tilde{x}(R)$, can be analyzed to obtain information about partial pair distribution functions of atoms around the absorber, including atomic species, distances between absorber and neighbor, and mean-square displacements in those distances.(24)

Figure 10:
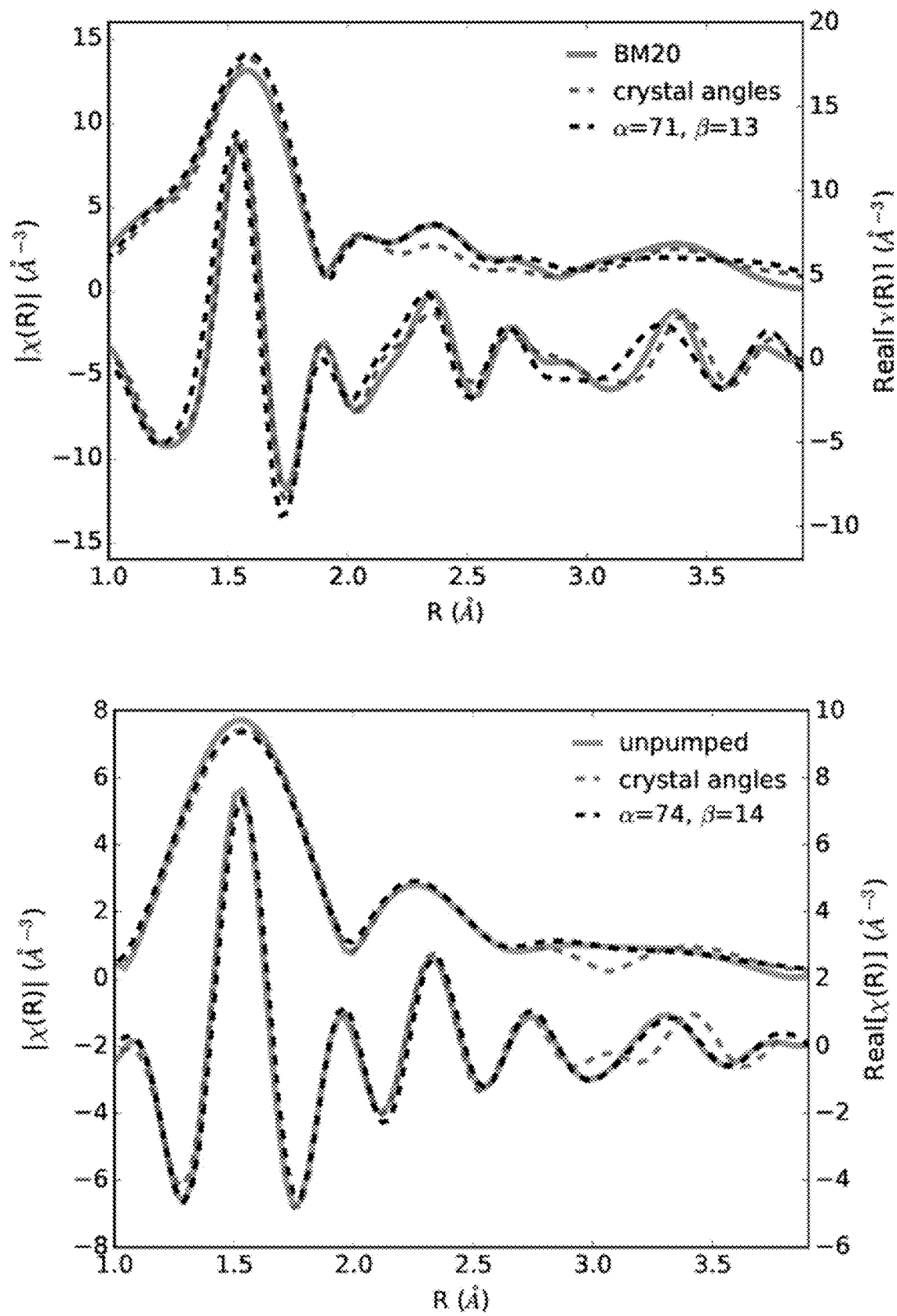
FIG. 10 shows (top) data with fits using crystalline angles and best-fit angles. The upper traces are associated with the left axis, and the lower traces are associated with the right axis. (bottom) Data from the unpumped spectrum with fits using crystalline angles and best-fit angles. The upper traces are associated with the left axis, and the lower traces are associated with the right axis.

We began with a model based upon crystallographic data. This model was unable to create satisfactory fits. Thus, we generated alternate molecular structures, which maintained all bond distances, while varying the O—Fe—O angle $\alpha$ and the Fe—C—$O_{far}$ angle $\beta$; see FIG. 8. $O_{far}$ refers to the O atoms farthest from the Fe. This model resulted in improved fits, both qualitatively and quantitatively. The reduced $X^2$ values for the fits to either data set improved by about a factor of 2 when the $\alpha$ and $\beta$ angles were allowed to deviate from their crystallographic starting values. The crystallographic values for $\alpha$ and $\beta$ were 80.43 and 14.6°. The best-fit values to the data from the BM20 beamline were 71±2 and 13±2°. The best-fit values to the data from the tabletop apparatus were similar, 74±3 and 14±3°. The Fe—O bond length was found to be 2.002±0.005 Å from the BM20 data and 2.008±0.005 Å from the unpumped data. FIG. 10 shows the fits discussed in this paragraph.

Structural parameters extracted from the unpumped microcalorimeter data are in good quantitative agreement with the same parameters extracted from the BM20 data, including $\beta$, which carries information about the second and third coordination shells. The remaining uncertainties in the molecular structure are likely dominated by features that are beyond the scope of common EXAFS analysis techniques, such as solvent molecules and the motion of atoms making up the ligands.

The pumped spectrum measures a mixture of the ferrioxalate molecule in the excited intermediate state and that in the ground state. Thus, there are two factors that influence the measured spectrum: (1) the absorption spectrum of the intermediate state and (2) the fraction of molecules excited into the intermediate state. Therefore, the normalized absorption of the sample when pumped, $A_p$, is given by $$A_P(E)=(1-f)A_g(E)+fA_i(E)$$

where $A_g$ and $A_i$ are normalized absorptions in the ground and intermediate states, respectively, and f is the fraction of the sample excited into the intermediate state. Then, the transmission of the sample is $$I(E,A)=I_0(E)e^{-A(E)d}$$

where $I_0(E)$ is the flux incident on the sample, $A(E)$ is the normalized absorption, and d is a unitless measure of the "edge step", that is, the EXAFS free "embedded atom" transmission is reduced by a factor of d/e at the Fe K edge, where e is Euler's number.

We proceed with a physically motivated guess for the form of $A_i(E)$, based on modification to $A_g(E)$ as measured by the BM20 data. While the parent molecule has three ligands, both proposed intermediates, $[Fe^{II}(C_2O_4)_2]^{2-}$ and $[Fe^{III}(C_2O_4)_2]^-$, have two ligands; therefore, we scale the amplitude of the EXAFS features by a factor of r=⅔. The primary signature of the oxidation of the Fe atom is expected to be an edge shift; therefore, we allow the location of the edge to vary by an energy $\Delta$. An EXAFS amplitude reduction and an edge shift are visible in the pumped data before this analysis, which is intended primarily to quantify the edge shift and determine the excitation fraction. This model requires additional parameters to account for the response function of the microcalorimeter spectrometer, a disagreement of 0.25 eV in absolute energy calibration of our instrument and the BM20 data, the shape of $I_0(E)$, and a factor that reduces the total EXAFS amplitude measured by our apparatus in both the unpumped and pumped spectra. This last factor is attributed to absorption by a secondary Fe species in residue caused by evaporation of the sample. This model fits the unpumped spectra (with f=0 fixed) with d=0.279±0.001 and reduced $X^2$ of 1.007, indicating that the model does an excellent job accounting for nonidealities in our measurement apparatus. The value of d is equivalent to an effective X-ray interaction length of 312 μm, consistent with the sample geometry. This model fits the pumped spectrum with f=0.21±0.04 and $\Delta$=−1.85±0.4 eV.

Figure 11:
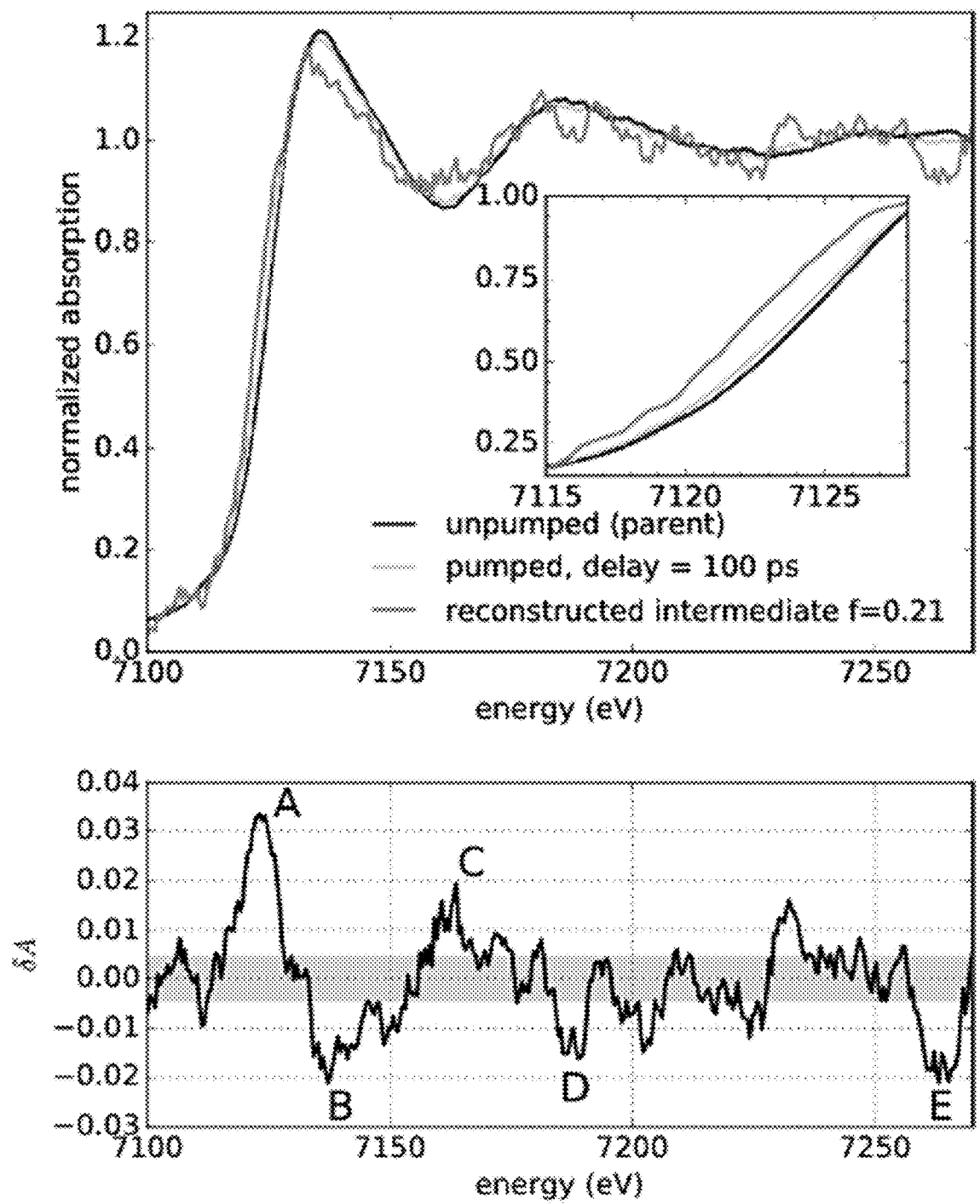
FIG. 11 shows (top) normalized absorption spectra of aqueous $[Fe^{III}(C_2O_4)_3]^{3-}$ at large negative delay (unpumped), at 100 ps delay, and the reconstructed intermediate spectrum at 100 ps, shown with a 5 eV moving average applied. (inset) Edge region expanded to show the edge shift more clearly. Axis units and legend colors apply to both the surrounding figure and the inset. (bottom) The difference A in the normalized absorption between the pumped and unpumped spectra is shown with a 5 eV moving average applied. A given 5 eV bin has an absorption difference uncertainty of ~0.005, shown as a gray band centered on $\delta A=0$. However, because of the moving average, the uncertainty on each point shown is not independent. The feature marked A is due to the edge shift. The features marked B and C and possibly the feature marked D are due to the reduction in amplitude of the EXAFS features.

FIG. 11 shows unpumped and pumped spectra, the inferred spectrum for the pure intermediate state, and the difference between the spectra from the unpumped and pumped states. The spectra are shown as normalized absorption, calculated for the unpumped spectrum as $$A_U(E) = -\log\left(\frac{C_U(E)}{I_0(E)}\right)\bigg/d,$$

with $I_0(E)$ and d determined from the previously described fit and $C_U(E)$ the actual counts per bin in the spectrum. The reconstructed intermediate state absorption spectrum is $$A_i(E) = \frac{A_P(E) - (1-f)A_U(E)}{f},$$

with f=0.21. The analysis of the pumped spectrum described so far assumes that the Fe—O bond length remains unchanged in the intermediate state.

We use two methods to assess the bond length change in our data and find that neither method provides a result consistent with a large negative bond length change. The first is a fit to the intermediate state spectrum in ARTEMIS using only a single Fe—O scattering path, which gives $\delta R$=0.14±0.06 Å.

The first approach does not treat the statistical uncertainty from the microcalorimeter spectrum rigorously; therefore, we also used energy space analysis where an additional term is added to $A_i(E)$ to represent the change in EXAFS signal resulting from altering the Fe—O bond length. The primary merits of the energy space approach are that (1) the uncertainty in the measured spectra is handled rigorously and (2) f, $\Delta$, and $\delta R$ can be varied simultaneously, which allowed us to determine that the additional free parameter $\delta R$ does not lead to alternate solutions with very different f and $\Delta$ values. The primary downside of this approach is that the EXAFS theory is known to be inaccurate very near the absorption edge; therefore, we take steps to exclude this range of data. From it, we found a range of values for $\delta R$ from −0.05 to 0.09 Å. This range covers the maximal variation in $\delta R$ from considering several different subranges of our data, as well as 2σ error bars. By design, these choices were very conservative, so that values of $\delta R$ that fall outside of this range can confidently be said to have been excluded. This range of values of $\delta R$ correspond to bond lengths from 1.96 to 2.10 Å.

Raw data included a time stream for each pixel, representing the current in that pixel. Individual x-ray events are represented by a transient current pulse, with larger energy x-rays causing larger magnitude current transients. Pulse records from the microcalorimeter array are stored to disk, then later analyzed with algorithms that convert each pulse record into an estimate of the pulse magnitude.

A calibration source is used to provide continuous calibration information throughout the measurement to enable conversion from pulse magnitude to incident x-ray energy. This source consists of a commercial x-ray tube that illuminates a calibration target. The calibration target is made from an alloy of many transition metals, so that the microcalorimeter array spectra includes multiple elemental fluorescence lines. Many of the transition metal Kα and Kβ line energies and shapes are known with metrological accuracy.

The geometry of the calibration source, see FIG. 12, allows x-rays from the laser plasma source to pass through a hole in the calibration target. This enables continuous calibration throughout the time-resolved measurement. The addition of this calibration source was critical to the success of these measurements, and is one of several improvements over previous, static microcalorimeter XAS work.

X-ray events are sorted into three groups based on the arrival time measured relative to a trigger from a photo-diode monitoring the pump beam. Two 20 µs arrival time windows are used to identify the pumped and unpumped groups. All other events are in the calibration group. A spectrum is generated from the calibration group, in which we identify the Kα and Kβ lines of several transition metals. Each line is fit with a model consisting of a line shape and the detector response function. The locations of the line centers from these fits are used to generate an individual calibration for each microcalorimeter pixel. The data from the individual pixels are then co-added with 0.5 eV bins to create spectra from each of the unpumped, pumped, and calibration groups of events.

Figure 13:
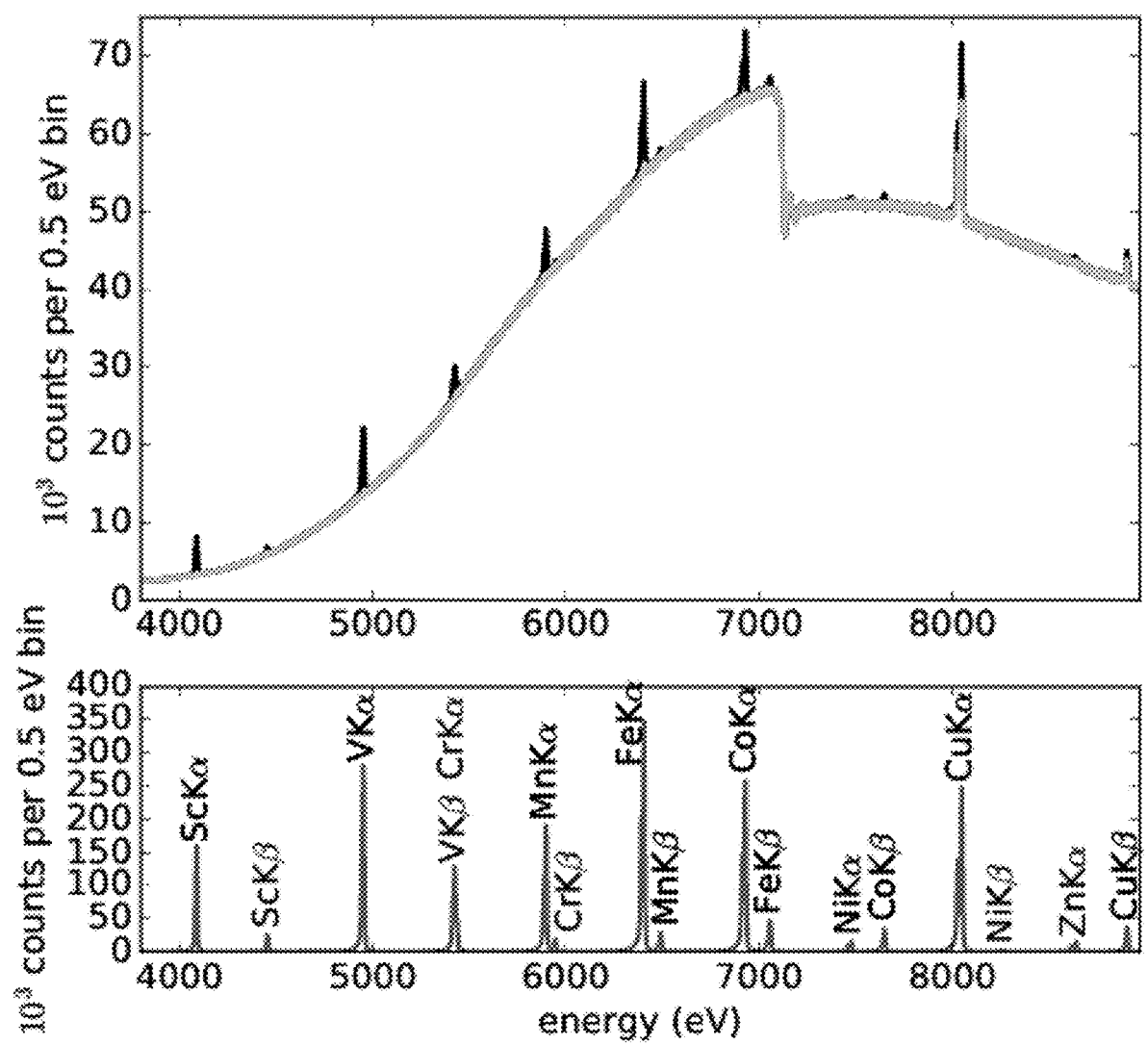
FIG. 13 shows a spectrum from all pulses in the 20 ps unpumped arrival time window (blue), and the unpumped spectrum generated by subtracting the component due to calibration x-rays arriving during that time window (red). The Fe K-edge is visible in both spectra at 7120 eV. The two lines remaining in the red spectrum are Cu lines originating from laser-generated x-rays striking the metal surface behind the microcalorimeter array. (bottom) The spectrum generated from all calibration pulses. Lines that overlapped another line, or that did not appear with sufficient intensity in all pixels were not used for calibration. X-ray lines used for calibration are labeled in blue, other lines are labeled in black.

We remove the contribution due to calibration x-rays arriving during the unpumped and pumped windows by subtracting the calibration spectrum multiplied by a constant calculated from the timing cuts. The primary practical effect of this subtraction is to remove the Fe Kβ and Co Kα lines from the Fe pre-edge region. The spectra after this subtraction are referred to as the pumped and unpumped spectra. FIG. 13 shows the unpumped spectrum before and after subtracting the calibration component (top), and the calibration spectrum including information on which calibration lines are used (bottom). The current microcalorimeter array achieves a FWHM Gaussian energy resolution of 6.5 eV at the Co Kα line (6930 eV) at low count rates. During our transmission measurement, we measured an 8.1 eV energy resolution at the same line due to the elevated rate of 5000 counts per second on the array.

Crosstalk is the reason for the degraded energy resolution relative to low count rate measurements, e.g., an event in pixel A causes a smaller signal in pixel B. The effect of crosstalk is larger for the x-rays generated by the laser than for the calibration x-rays generated by the tube source because the laser generated x-rays arrive simultaneously. The energy resolution in the x-ray transmission spectrum is discussed in a later section, and is slightly worse than the energy resolution measured at the Co Kα line. The fits to the lines in the calibration spectrum are much better when we include a small non-Gaussian component in the detector response, which we refer to as the tail. This component arises from long-lived states in the Bi absorbers on the microcalorimeter pixels. We and other detector groups have made x-ray microcalorimeter pixels with Au absorbers that show no tail. We have found that the tail is well modeled by a single low-energy exponential.

With regard to sample preparation, 98% $(NH_4)_3Fe(C_2O_4)_3 \cdot 3H_2O$ was used in which 187±0.1 g of this sample was disposed in a glass beaker. Distilled water was added to bring the total volume to 1±0.02 L. The solution was mixed with a stainless steel implement, and placed in an ultrasonic bath for 30 minutes. The solution was passed through 15 µm filter paper before being circulated. There was a 25 µm filter between the peristaltic pump and the sample jet. The polycapillary x-ray optic has an 18° convergent angle and 20 mm focal distance on the input side. It has a 12° convergent angle and 25 mm focal distance on the sample side. The manufacturer reports that at 8 keV the efficiency is 12% and the focal spot size is 83 µm. The efficiency is reduced to 6% at 2 keV and 14 keV.

While measuring static EXAFS spectra at beamline BM20 at the APS, the incident beam was monochromatized using a Si(111) double crystal monochromator. A rhodium-coated x-ray mirror was used to suppress higher order harmonics. Multiple measurements were made on each sample, and these measurements were found to be consistent.

FIG. 5 shows $|\tilde{x}(R)|$ which is the magnitude of the Fourier transform of the data in FIG. 4 after background subtraction and conversion from energy to photoelectron wavenumber. The Fourier transform is performed with zero padding, which has an effect similar to interpolation in R space. The plots in FIG. 5 appear densely sampled as a result of this zero padding, and will always appear smooth, regardless of the input data. This is standard in EXAFS data analysis, and is done by the ARTEMIS software by default. This aspect of EXAFS data analysis explains why the signal-to-noise ratio in the upper and lower parts of FIG. 10 appears so similar even though the originating data in energy-space has quite different signal-to-noise levels.

With regard to fitting spectra, we characterize the non-idealities of the measurements by creating a model based on the very high signal-to-noise ratio (SNR) absorption spectrum measured at BM20, and fitting that model to the unpumped spectrum. Then we develop a simple, physically motivated model for the absorption of the intermediate state. This model is based on the BM20 data and incorporates an edge shift to account for a change in oxidation state and a reduction in the EXAFS amplitude to account for an intermediate state structure with fewer ligands than ferrioxalate. We then fit the model to the pumped spectrum. The transmission I(E;A) of a sample at energy E can be expressed as $$I(E,A) = I_0(E) e^{-A(E)d}$$

where $I_0(E)$ is the flux incident on the sample, A(E) is the normalized absorption, d is a unitless measure of the edge step, i.e., the EXAFS free embedded atom transmission is reduced by a factor d=e at the Fe K edge, where e is Euler's number.

We choose this notation because our measurement configuration averages over many sample interaction lengths. In the more common notation $A(E) = \mu(E)x^*$, where $\mu(E)$ is the absorption coefficient and $x^*$ is the sample thickness required for the EXAFS free embedded atom transmission to be reduced by a factor 1/e at the Fe K-edge. The flux incident on the sample in this experiment varies slowly with energy and lacks emission lines.

For the limited energy range used here, a third order polynomial is sufficient to model the incident flux as $I_0(E) = b_0 + b_1 E + b_2 E^2 + b_3 E^3$. We take the normalized absorption of ferrioxalate as measured at BM20 of the APS to be $A_g(E)$. We found that the amplitude of the EXAFS features in our unpumped spectrum are lower than those of $A_g(E)$ and therefore include an additional absorption component $$A_s(E) = \begin{cases} A_g(E) & \text{if } E < 7127.33 \text{ eV} \\ 1 & \text{if } E \geq 7127.33 \text{ eV} \end{cases}$$

which lacks EXAFS features and accounts for a fraction of the absorption at the Fe K-edge, where s is the fraction of the Fe K-edge due to absorption in ferrioxalate. The reduced EXAFS amplitude is likely due to Fe-containing species in residue on surfaces in the x-ray beam path. The energy 7127.33 eV is chosen because it is the lowest energy for which $A_g(E) \geq 1$. To model the absorption in the pumped spectrum $A_p(E)$, we assume that a fraction f of the ferrioxalate is transformed into an intermediate state with normalized absorption $A_i(E)$.

Figure 14:
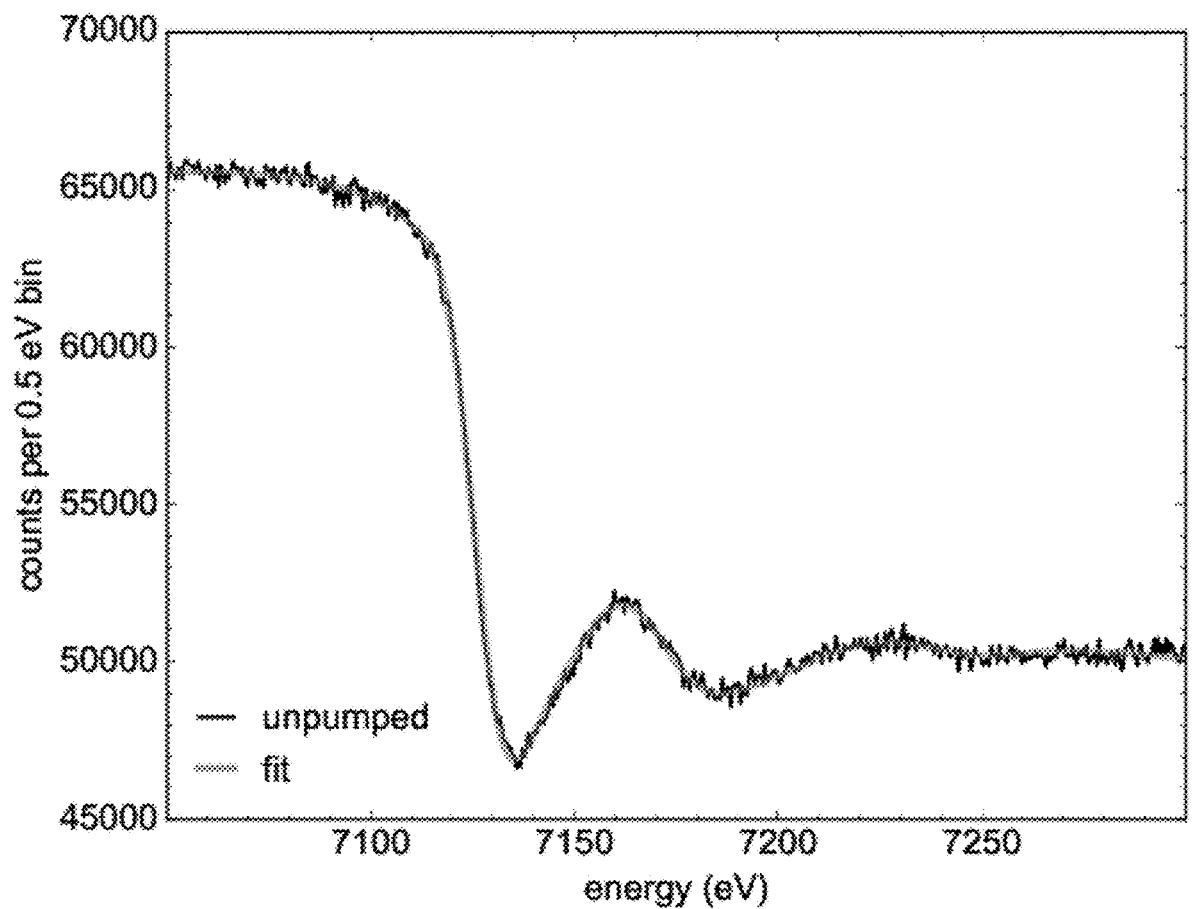
FIG. 14 shows an unpumped x-ray transmission spectrum of ferrioxalate at the Fe K edge $C_U(E)$, and the $C_u(E)$ calculated with the best fit parameters. The function $C_u(E)$ is computed from the data measured at BM20 and some additional mathematics to account for the non-idealities of our measurement apparatus, such as the poorer energy resolution.

The microcalorimeter array response function is modeled with a Gaussian component (the energy resolution), and a low-energy exponential tail. Thus, the model for the expected number of counts per energy bin measured by the microcalorimeter array is $C_x(E) = I(E-\Theta, A_x) \otimes D(E)$ with detector response function $$D(E) = e^{\frac{-E^2}{2v^2}} \otimes \left[ \frac{\kappa}{\xi} e^{\frac{E}{\xi}} H(-E) + (1-\kappa)\delta(E) \right]$$

where $\otimes$ indicates convolution, 2.355 v is the FWHM energy resolution, $\kappa$ is the fraction of counts in a low energy tail with decay scale $\xi$, H is the Heaviside function, $\delta$ is the Dirac delta function, and $\theta$ is a correction for a disagreement in the absolute energy calibration of the microcalorimeter array and the reference spectrum $A_g(E)$. Here, a family of functions includes the subscript x indicates which function $A_x(E)$ is used. The tail parameters $\kappa=0.17$ and $\xi=23$ eV are determined by fitting to the Co K$\alpha$ calibration line. Noise in spectra measured with the microcalorimeter array follow Poisson statistics. For an energy bin with an expectation value of N the observed number of counts, one observes $N \pm \sqrt{N}$ counts. For an energy bin in which there is no physical reason for the pumped and unpumped spectra to differ, e.g., far from the iron edge, then the difference $N_U$-$N_P$ follows a normal distribution with standard deviation $(N_U + N_P)^{1/2}$. Hereafter capital subscripts indicate data from the unpumped and pumped spectra, and lower-case subscripts are used in expressions intended to model these data. As a test, we calculated the standard deviation of the quantity $(N_U - N_P)/\sqrt{N_U + N_P}$ for all bins far from the Fe edge, and find the value 1.0001. This confirms that the differences between the pumped and unpumped spectra are Poisson limited except at energies where dynamic behavior is present. To learn the values of the free parameters of $C_u(E)$, we performed least squares fit on the unpumped spectrum with 0.5 eV bins, with each bin weighted by an uncertainty calculated as the square root of the number of counts in that bin. The best fit parameters are $d=0.279\pm0.001$, $s=0.75\pm0.01$, $\theta=^-0.252\pm0.04$ eV, and FWHM energy resolution $10.6\pm0.2$ eV with a reduced chi-squared value of 1.007. The incident flux parameters are also determined from this fit. Fits to the pumped spectrum use the values from this fit as fixed parameters. We found the best fit parameters vary by less than the fit uncertainty when we vary the bin size and the energy over which we fit by factors of two. The unpumped spectrum and fit are shown in FIG. 14. The value of d is equivalent to an effective x-ray interaction length of 312 μm, which is consistent with the sample geometry. We determined that the free parameter s provides a better explanation for our data than a more degraded energy resolution by comparing fits with and without s as a free parameter. The fit with $s=1$ fixed visibly overestimates the amplitude of the EXAFS features and the reduced chi-squared value is increased to 1.37.

In order to determine the excitation fraction f, we choose a physically motivated estimate for $A_i$. The pumped spectrum shows two qualitative differences from the unpumped spectrum: (1) the edge appears at a lower energy and (2) the amplitude of the oscillatory absorption features is reduced. Thus, we define $A_i(E) = rA_u(E-\Delta) + (1-r)A_s(E)$ where r is a reduction in the amplitude of the EXAFS features and $\Delta$ an edge shift. Both r and $\Delta$ have simple physical interpretations. The edge shift $\Delta$ is related to changes in the oxidation state of the Fe atom, while the amplitude reduction r results from a reduction in the number of oxalate ligands contributing to the EXAFS spectrum. The plausible intermediate states presented in previous work have either two $C_2O_4$ ligands, or two ligands plus one partially disassociated ligand. The amplitude of EXAFS features is roughly linear in the number of nearest neighbor atoms, so we expect the primary difference in the EXAFS features to be a ⅓ reduction in amplitude. Thus, we choose $r=⅔$. We performed least squares fit to the pumped spectrum using the function $C_p(E)$ with free parameters f and $\Delta$. All other parameters were fixed to the value from the fit to the unpumped spectrum. The best fit parameters are $f=0.21\pm0.04$ and $\Delta=^-1.85\pm0.4$ eV. The choice $r=⅔$ is better physically motivated. Nonetheless, we took steps to explore the consequences of this choice. We performed a fit with $r=1$ fixed, yielding $f=0.08\pm0.04$, $\Delta=^-4.1\pm1.9$ eV. Choosing $r=1$ causes the estimate to increase.

Additional data taken with the x-ray spectrometer, with a sample including aqueous ferrioxalate in a polyimide tube and protected from light exposure, is consistent with $s=1$; in other words, the EXAFS amplitude matches that from the BM20 data. The necessity for a value $s<1$ to explain the unpumped data is therefore not fundamental to the apparatus, and instead must be related to the presence of the pump beam. The experiment was complicated by evaporation caused by the large pump energy; many surfaces were covered with a layer of residue. A moving spool of polyimide film was placed over the entrance window of the microcalorimeter spectrometer, replacing the film in front of the window every ~60 seconds. The polycapillary optic had a layer of polyimide film covering the exit as well, but it was not refreshed because we observed much less residue on this film. We suspect that some Fe-containing residue in the beam path is responsible for the reduced EXAFS features. Other possibilities include a buildup of an undesirable Fe species in the sample solution due to the extended duration of the experiment. This is less plausible due to the low solubility of the photoproduct, the observation of precipitate in the sample reservoir, and the observation that the amplitude reduction factor s was equal on days when the sample was refreshed vs days when the sample was not refreshed.

We also determined that averaging the transmission spectra from many pixels, each with slightly different sample interaction length, is not a sufficient explanation for the required value of s. We use the knowledge that many Fe species, including metallic Fe and FeO have much smaller EXAFS amplitude than ferrioxalate to motivate the functional form of $A_s(E)$.

With regard to Fe—O bond length change, here we describe the energy-space method used to assess the bond length change in the pumped data. Two possible deformations that lead to non-zero values of δR are considered; 1) The nearest neighbor O atoms move independently of the remaining C and O atoms. 2) The $C_2O_4$ ligands move as rigid units.

Using a differential technique reduces the impact of the remaining uncertainty in the ground state model. Consider a model for the intermediate state normalized absorption $A_{i*}(E)=r[A_{i*}(E-\Delta)+A_{\delta R}(E)s]+(1-r)A_s(E)$ where $A_{\delta R}$ is an absorption term due to the Fe—O distance R changing by a distance δR. Here, δR=0. This term is calculated by differencing the output of two FEFF6 calculations based on the ground state structure of ferrioxalate as determined from the BM20 data. The model with the best fit parameters from the BM20 is run once unmodified to produce output $A_1(E)$. Then, the model is run a second time with path lengths changed to reflect case 1 or 2 to produce output $A_2(E)$. Finally, $A_{\delta R}(E)=A_2(E)-A_1(E)$. We performed a fit to the pumped spectrum with function $C_P(E)$, substituting $A_{i*}(E)$ for $A_i(E)$. To determine if the near-edge portion of the EXAFS theory was influencing the results, we repeated this fit many times excluding the data in a range of energies above the edge. When the size of this range was varied from 0 to 50 eV the resulting values δR varied from −0.012±0.017 A to 0.038±0.025 for case 1 and 0.003±0.015 A to 0.033±0.022 A for case 2. We choose the two most extreme values obtained by taking the fit value plus or minus two times the fit uncertainty, and conclude that our data is consistent with all Fe—O bond length changes between these two values; our data is consistent with an Fe—O bond length change in the range −0.05 A to 0.09 A.

When performing fits with excluded data in the near edge region, we used only one free parameter, which was δR. Excluding this data causes f and Δ to be poorly constrained, because information on the location of the absorption edge is reduced. When performing the fit with 0 eV of excluded data, we used three parameters δR, Δ and f.

In x-ray absorption pump-probe experiments, the signal size depends on the fraction of the sample that is pumped into the intermediate state. Factors affect the fraction of the sample excited into the intermediate state. Two factors are: 1) n, the number of pump photons per molecule of ferrioxalate, and 2) OD, the total optical density of the sample jet. We calculate $$n = \frac{I_{peak}d}{E_\gamma tc_0 N_A} \text{ where } I_{peak} = \frac{2E}{d\pi(xy/4)}$$

is the peak beam intensity; E is the energy per pulse, x and y are the full width at half maximum dimensions of the pump beam on the sample, t is the thickness of the sample jet parallel to the pump beam, $E\gamma=hc\lambda_{pump}$ is the energy per photon, $N_A$ is Avogadro's number, $c_0$ is the sample concentration, and d is the duration of the pump pulse.

The transmitted power is equal to $10^{-OD}$ times the incident pump power, where OD=$tc_0\in$ is the optical density, and the extinction coefficient $\in$ is 160 $M^{-1}$ $cm^{-1}$ at 400 nm and 4800 $M^{-1}$ $cm^{-1}$ at 268 nm. A large OD means that the far end of the sample jet is pumped with much less intensity than the near end. At OD 2, half of the sample molecules, those residing at the far end of the sample jet, absorb only 9% of the incident photons. The pump and sample jet parameters influence the number of photons per molecule and the OD. The excitation fraction f is 3.5 times lower than the number of photons per molecule. The OD value in our experiment leads to a uniform excitation profile versus depth into the sample.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An x-ray spectrometer comprising:
    an x-ray plasma source that produces first x-rays;
    an x-ray optic in optical communication with the x-ray plasma source and that:
        receives the first x-rays from the x-ray plasma source;
        focuses the first x-rays to produce second x-rays; and
        communicates the second x-rays to a sample that produces product x-rays in response to receipt of the second x-rays and second light; and
    a microcalorimeter array detector in optical communication with the sample and that receives the product x-rays from the sample,
    wherein:
        the second x-rays, the sample, and the second light are coincident in an interaction volume,
        the second x-rays and the sample copropagate with an acute angle between directions of propagation of the second x-rays and the sample, and
        the x-ray spectrometer provides time-resolved emission and absorption spectroscopy.

2. The x-ray spectrometer of claim 1, further comprising a second light source in optical communication with the sample and that produces the second light and communicates the second light to the sample,
    wherein the sample produces the product x-rays in response to receipt of the second x-rays and the second light.

3. The x-ray spectrometer of claim 1, further comprising a first light source in optical communication with the x-ray plasma source and that produces first light and communicates the first light to the x-ray plasma source,
    wherein the x-ray plasma source produces the first x-rays in response to receipt of the first light.

4. The x-ray spectrometer of claim 1, further comprising an analyzer in electrical communication with the microcalorimeter array detector and that receives a detector signal from the microcalorimeter array detector.

5. The x-ray spectrometer of claim 4, wherein the analyzer determines an x-ray spectrum of the sample from the detector signal.

6. The x-ray spectrometer of claim 1, further comprising:
    a calibrant target in optical communication with the microcalorimeter array detector and that produces second reference x-rays, from first reference x-rays.

7. The x-ray spectrometer of claim 6, further comprising:
    a reference x-ray source in optical communication with calibrant target and that produces the first reference x-rays.

8. A process for performing x-ray spectroscopy, the process comprising:
    providing the x-ray spectrometer of claim 1;
    producing the first x-rays;
    receiving, by the x-ray optic, the first x-rays from the x-ray plasma source;
    focusing, by the x-ray optic, the first x-rays;
    producing, by the x-ray optic, the second x-rays;
    communicating the second x-rays to the sample;
    receiving, by the sample, second light;
    producing product x-rays in response to receipt of the second x-rays and the second light; and
    receiving, by the microcalorimeter array detector, the product x-rays from the sample to perform x-ray spectroscopy,
    wherein:
        the second x-rays, the sample, and the second light are coincident in an interaction volume; and
        the second x-rays and the sample copropagate with an acute angle between directions of propagation of the second x-rays and the sample, and
        the x-ray spectrometer provides time-resolved emission and absorption spectroscopy.

9. The process of claim 8, further comprising:
    producing the second light by a second light source that is in optical communication with the sample;
    communicating the second light to the sample; and
    producing, by the sample, the product x-rays in response to receipt of the second x-rays and the second light.

10. The process of claim 9, further comprising:
    producing first light by a first light source in optical communication with the x-ray plasma source;
    communicating the first light to the x-ray plasma source; and
    producing, by the x-ray plasma source, the first x-rays in response to receipt of the first light.

11. The process of claim 9, further comprising:
    receiving a detector signal from the microcalorimeter array detector by an analyzer in communication with the microcalorimeter array detector.

12. The process of claim 11, further comprising:
    determining, by the analyzer, an x-ray spectrum of the sample from the detector signal.

13. The process of claim 8, further comprising:
    receiving, by a calibrant target in optical communication with the detector, first reference x-rays;
    producing second reference x-rays by the calibrant target from the first reference x-rays.

14. The process of claim 9, further comprising:
    producing the first reference x-rays from a reference x-ray source that is in optical communication with the calibrant target.

* * * * *